United States Patent
Zhang et al.

(10) Patent No.: US 12,518,549 B2
(45) Date of Patent: Jan. 6, 2026

(54) SYSTEM AND METHOD FOR CONTRASTIVE AFFINITY LEARNING VIA AUXILIARY PROMPTS FOR GENERALIZED NOVEL CATEGORY DISCOVERY

(71) Applicant: Mohamed bin Zayed University of Artificial Intelligence, Abu Dhabi (AE)

(72) Inventors: Sheng Zhang, Abu Dhabi (AE);
Salman Khan, Abu Dhabi (AE);
Zhiqiang Shen, Abu Dhabi (AE);
Muzammal Naseer, Abu Dhabi (AE);
Guangyi Chen, Abu Dhabi (AE);
Fahad Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 252 days.

(21) Appl. No.: 18/460,932

(22) Filed: Sep. 5, 2023

(65) Prior Publication Data
US 2025/0078546 A1    Mar. 6, 2025

(51) Int. Cl.
*G06V 20/70*    (2022.01)

(52) U.S. Cl.
CPC .................................... *G06V 20/70* (2022.01)

(58) Field of Classification Search
None
See application file for complete search history.

(56) References Cited

U.S. PATENT DOCUMENTS

| | | | |
|---|---|---|---|
| 2022/0156591 A1* | 5/2022 | Li | G06V 10/82 |
| 2023/0359900 A1* | 11/2023 | Li | G06V 10/759 |
| 2025/0061699 A1* | 2/2025 | Devaguptapu | G06N 20/00 |

FOREIGN PATENT DOCUMENTS

| | | | | |
|---|---|---|---|---|
| CN | 114782458 A | * | 7/2022 | ............. G06N 3/045 |
| CN | 116468112 A | * | 7/2023 | ............. G06N 3/096 |
| WO | WO-2025075245 A1 | * | 4/2025 | ............... G06T 7/11 |

OTHER PUBLICATIONS

Zhaowei Cai, et al., "Exponential Moving Average Normalization for Self-supervised and Semi-supervised Learning", Computer Science > Machine Learning, arXiv:2101.08482v2 [cs.LG], Jun. 18, 2021, pp. 1-12.

(Continued)

*Primary Examiner* — Bernard Krasnic
(74) *Attorney, Agent, or Firm* — Oblon, McClelland, Maier & Neustadt, L.L.P.

(57) ABSTRACT

A system and method of fine-grained image category discovery with few human annotations includes a camera and a trained machine learning model, which predicts a label for an object in a captured image and outputs the predicted label. The machine learning model is trained by contrastive affinity learning, including retrieving images having an object, a warm-up stage in which semi-supervised contrastive learning is performed based on projected features of a class token and an ensembled prompt, respectively. In a contrastive affinity learning stage, a student model and an exponentially moving averaged teacher model are forwarded with different augmented views of the retrieved images. Teacher embeddings are enqueued into a token-specific memory. A semi-supervised contrastive loss is computed on a current batch and a contrastive affinity learning loss for student embeddings and the teacher embeddings with pseudo-labels from a affinity graph dynamically generated by semi-supervised affinity generation.

20 Claims, 28 Drawing Sheets

(56) References Cited

OTHER PUBLICATIONS

Yutong Bai, et al., "Point-Level Region Contrast for Object Detection Pre-Training", Computer Science > Computer Vision and Pattern Recognition, arXiv:2202.04639v2 [cs.CV], Apr. 19, 2022, pp. 1-12.

Gaoxiang Chen, et al., "MTANS: Multi-Scale Mean Teacher Combined Adversarial Network with Shape-Aware Embedding for Semi-Supervised Brain Lesion Segmentation", Neuroimage, vol. 244, 2021, pp. 1-16.

Yadang Chen, et al., "Semi-Supervised Contrastive Learning for Few-Shot Segmentation of Remote Sensing Images", Remote Sensing, vol. 14, Issue 17, Aug. 29, 2022, pp. 1-17.

\* cited by examiner

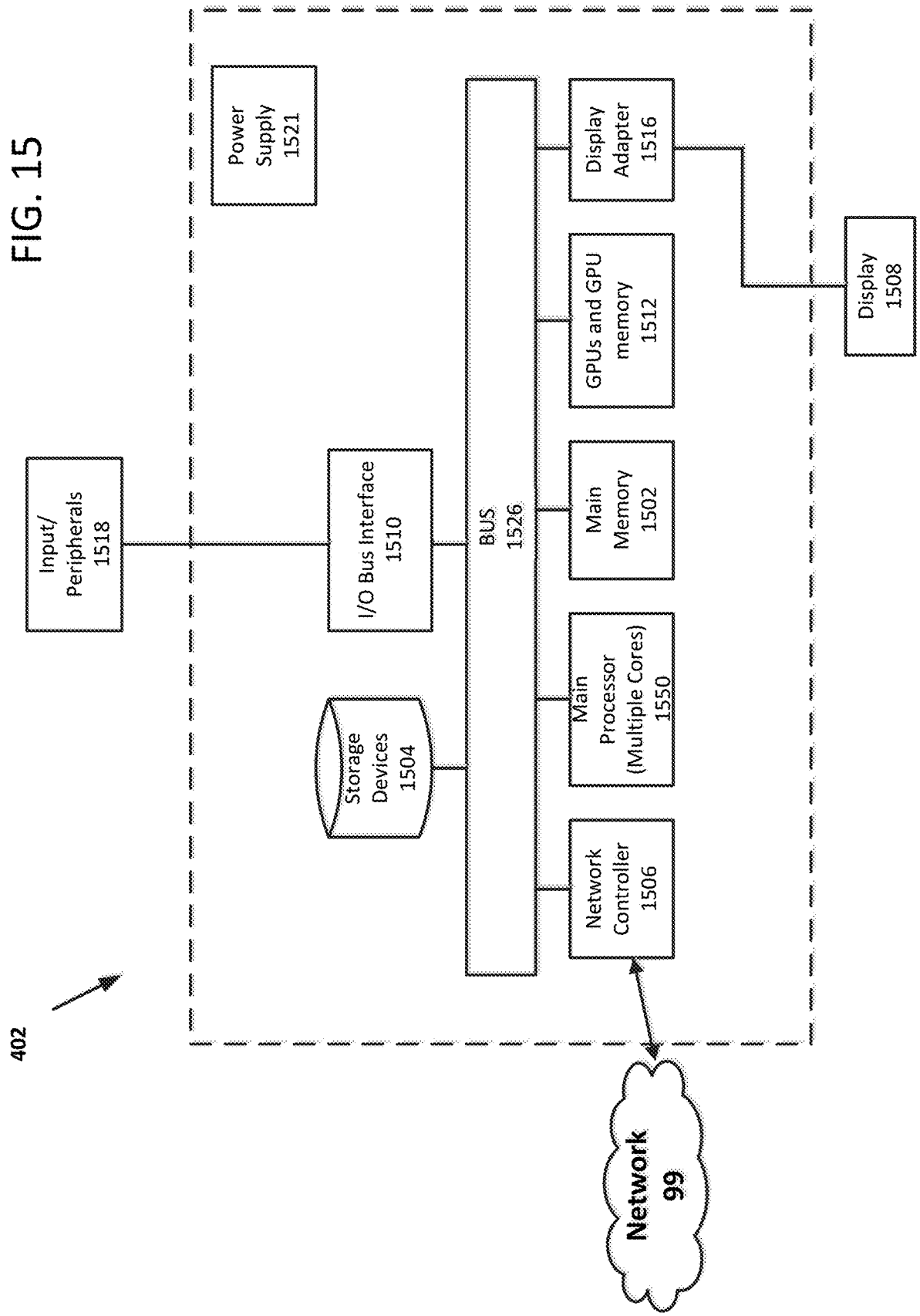

SYSTEM AND METHOD FOR CONTRASTIVE AFFINITY LEARNING VIA AUXILIARY PROMPTS FOR GENERALIZED NOVEL CATEGORY DISCOVERY

STATEMENT REGARDING PRIOR DISCLOSURE BY THE INVENTORS

Aspects of this technology are described in Zhang, Sheng, Salman Khan, Zhiqiang Shen, Muzammal Naseer, Guangyi Chen, and Fahad Shahbaz Khan, "Promptcal: Contrastive affinity learning via auxiliary prompts for generalized novel category discovery," in *Proceedings of the IEEE/CVF Conference on Computer Vision and Pattern Recognition*, pp. 3479-3488(2023) and related Appendix, which are incorporated herein by reference in their entireties. The code along with pre-trained models are available at: github.com/sheng-eatamath/PromptCAL.

BACKGROUND

Technical Field

The present disclosure is directed to a system and method for Generalized Novel Category Discovery (GNCD), that treats unlabeled data as potentially containing both known and novel classes. The system provides a solution to false negatives in contrastive training through an approach that identifies semantic clusters in unlabeled data by simultaneous semantic prompt learning based on discriminative prompt regularization loss and representation calibration based on a contrastive affinity learning process. The system and method are useful in methods and systems for image identification as well as fine-grained image identification.

Description of Related Art

Generalized category discovery is a machine learning approach that learns to categorize unlabeled training data containing known and novel classes based on the knowledge of labeled known classes. A more challenging category discovery is fine-grained image classification. Fine-grained image classification is a task in computer vision where the goal is to classify images into subcategories within a larger category. Different from generalized category discovery, fine-grained visual classification aims to identify different subclasses within the same broad class. As the differences in objects within such subclasses are often small, this poses a greater challenge.

Image classification tasks have been performed using deep neural networks trained using supervised learning. However, obtaining labeled data for supervised learning requires a great deal of human resources. Semi-supervised learning (SSL) is a machine learning technique that uses a small portion of labeled data and lots of unlabeled data to train an image classification model.

Deep neural networks have demonstrated favorable performance in the Semi-Supervised Learning (SSL) setting. See Samer Hijazi, Rishi Kumar, Chris Rowen, et al. Using convolutional neural networks for image recognition. *Cadence Design Systems Inc.*: San Jose, CA, USA, 9, 2015; Junnan Li, Caiming Xiong, and Steven C H Hoi. Comatch: Semi-supervised learning with contrastive graph regularization. In *Proceedings of the IEEE/CVF International Conference on Computer Vision*, pages 9475-9484, 2021; Jesper E Van Engelen and Holger H Hoos. A survey on semi-supervised learning. *Machine Learning*, 109(2): 373-440, 2020; Qizhe Xie, Minh-Thang Luong, Eduard Hovy, and Quoc V Le. Self-training with noisy student improves imagenet classification. In *Proceedings of the IEEE/CVF conference on computer vision and pattern recognition*, pages 10687-10698, 2020; and Xiaohua Zhai, Avital Oliver, Alexander Kolesnikov, and Lucas Beyer. S4l: Self-supervised semi-supervised learning. In *Proceedings of the IEEE/CVF International Conference on Computer Vision*, pages 1476-1485, 2019, each incorporated herein by reference in their entirety. Some recent works can even achieve comparable performance to their fully-supervised counter parts using few annotations for image recognition. See Zhaowei Cai, Avinash Ravichandran, Paolo Favaro, Manchen Wang, Davide Modolo, Rahul Bhotika, Zhuowen Tu, and Stefano Soatto. Semi-supervised vision transformers at scale. *arXiv preprint arXiv:* 2208.05688, 2022; Antti Tarvainen and Harri Valpola. Mean teachers are better role models: Weight-averaged consistency targets improve semi-supervised deep learning results. *Advances in neural information processing systems*, 30, 2017; and Xie et al However, these approaches heavily rely on the closed-world assumption that unlabeled data share the same underlying class label space as the labeled data. See Chuanxing Geng, Sheng-jun Huang, and Songcan Chen. Recent advances in open set recognition: A survey. *IEEE transactions on pattern analysis and machine intelligence*, 43(10): 3614-3631, 2020; and Jingkang Yang, Kaiyang Zhou, Yixuan Li, and Ziwei Liu. Generalized out-of-distribution detection: A survey. *arXiv preprint arXiv:* 2110.11334, 2021, each incorporated herein by reference in their entirety. In many realistic scenarios, this closed-world assumption does not hold true because of the inherent dynamism of real-world tasks where novel classes can emerge in addition to known classes.

In contrast to SSL, the Novel Category Discovery (NCD) problem was introduced to relax the closed-world assumption of SSL, which assumes the unlabeled data contain novel classes. See Kai Han, Andrea Vedaldi, and Andrew Zisserman. Learning to discover novel visual categories via deep transfer clustering. In *Proceedings of the IEEE/CVF International Conference on Computer Vision*, pages 8401-8409, 2019, incorporated herein by reference in its entirety. Recently, the nascent Generalized Novel Category Discovery (GNCD) problem, first proposed in Cao et al. and Vaze et al., extends NCD and assumes the unlabeled data can contain both known and novel classes, which is more pragmatic and challenging. See Kaidi Cao, Maria Brbic, and Jure Leskovec. Open-world semi-supervised learning. *arXiv preprint arXiv:* 2102.03526, 2021; and Sagar Vaze, Kai Han, Andrea Vedaldi, and Andrew Zisserman. Generalized category discovery. In *Proceedings of the IEEE/CVF Conference on Computer Vision and Pattern Recognition*, pages 7492-7501, 2022. GNCD intends to categorize images sampled from predefined categories in the training set comprising labeled-knowns, unlabeled-knowns, and unlabeled-novels.

Novel Category Discovery (NCD), first formulated by deep transfer clustering (DTC), aims to categorize the unlabeled novel classes by transferring the knowledge from labeled known classes. See Han et al. (2019); Enrico Fini, Enver Sangineto, Stéphane Lathuilière, Zhun Zhong, Moin Nabi, and Elisa Ricci. A unified objective for novel class discovery. In *Proceedings of the IEEE/CVF International Conference on Computer Vision*, pages 9284-9292, 2021; Han et al. (2020); Junyuan Xie, Ross Girshick, and Ali Farhadi. Unsupervised deep embedding for clustering analysis. In *International conference on machine learning*, pages 478-487. PMLR, 2016; Bingchen Zhao and Kai Han. Novel visual category discovery with dual ranking statistics and mutual knowledge distillation. *Advances in Neural Information Processing Systems*, 34:22982-22994, 2021; Zhun Zhong, Enrico Fini, Subhankar Roy, Zhiming Luo, Elisa Ricci, and Nicu Sebe. Neighborhood contrastive learning for novel class discovery. In *Proceedings of the IEEE/CVF Conference on Computer Vision and Pattern Recognition*, pages 10867-10875, 2021; and Zhun Zhong, Linchao Zhu, Zhiming Luo, Shaozi Li, Yi Yang, and Nicu Sebe. Openmix: Reviving known knowledge for discovering novel visual categories in an open world. In *Proceedings of the IEEE/CVF Conference on Computer Vision and Pattern Recognition*, pages 9462-9470, 2021. The challenging NCD differs from SSL in that the unlabeled data are sampled from distinct underlying semantic distribution. DTC proposes to jointly warm up network weights and cluster prototypes based on DEC method on unlabeled data, and then fit an annealing sharpened distribution. RankStats and RS+ propose to utilize ranking statistics to generate pseudo positives among unlabeled novel classes. OpenMix transfers semantic knowledge by MixUp augmentation between known and novel classes as well as between reliable novel anchors and other novel examples. See Zhun Zhong, Linchao Zhu, Zhiming Luo, Shaozi Li, Yi Yang, and Nicu Sebe, "Openmix: Reviving known knowledge for discovering novel visual categories in an open world," in *Proceedings of the IEEE/CVF Conference on Computer Vision and Pattern Recognition*, pages 9462-9470, 2021; and Hongyi Zhang, Moustapha Cisse, Yann N Dauphin, and David Lopez-Paz. mixup: Beyond empirical risk minimization. *arXiv preprint arXiv:* 1710.09412, 2017, each incorporated herein by reference in their entirety. Neighboring contrastive learning (NCL) proposes a neighborhood contrastive loss and a hard-negative generation process by mixing novel and known classes. See Zhun Zhong, Enrico Fini, Subhankar Roy, Zhiming Luo, Elisa Ricci, and Nicu Sebe. Neighborhood contrastive learning for novel class discovery. In *Proceedings of the IEEE/CVF Conference on Computer Vision and Pattern Recognition*, pages 10867-10875, 2021; and Hongyi Zhang, Moustapha Cisse, Yann N Dauphin, and David Lopez-Paz. mixup: Beyond empirical risk minimization. *arXiv preprint arXiv:* 1710.09412, 2017, each incorporated herein by reference in their entirety. UNO first formulates the NCD problem into classification based on dynamic class assignments by Sinkhorn-Knopp algorithm. See Fini et al.; and Philip A Knight. The sinkhorn-knopp algorithm: convergence and applications. *SIAM Journal on Matrix Analysis and Applications*, 30(1): 261-275, 2008, each incorporated herein by reference in their entirety. WTA addresses multi-modal novel category discovery by inter- and intra-modal contrastive learning with permutation-ensembled ranking statistics as the pseudo-labeling method. See Xuhui Jia, Kai Han, Yukun Zhu, and Bradley Green. Joint representation learning and novel category discovery on single- and multi-modal data. In *Proceedings of the IEEE/CVF International Conference on Computer Vision*, pages 610-619, 2021, incorporated herein by reference in its entirety.

The Generalized Novel Category Discovery (GNCD) problem further extends NCD under a more realistic assumption that unlabeled data can be both sampled from novel classes and known classes. Specifically, the model learns to categorize unlabeled training data containing known and novel classes based on the knowledge of labeled known classes. ORCA proposes an uncertainty adaptive margin loss to reduce the intra-class variances between known and novel classes.

Contrastive Learning is a deep learning technique for unsupervised learning. The goal is to learn a representation of data such that similar instances are close together in the representation space, while dissimilar instances are far apart. The idea behind contrastive learning is that given a reference, or "anchor" sample, a similar or "positive" sample, and a different or "negative" sample, the training brings positive samples close to the anchor sample in an embedding space while pushing negative samples far apart.

Contrastive learning can also be applied to semi-supervised learning by combining unsupervised learning with supervised learning. One approach may be to use a contrastive loss function to learn a representation of the unlabeled data, and then use a supervised loss function to learn a classifier or a predictor on the labeled data.

Semi-supervised learning has recently shown great potential in vision tasks by way of contrastive learning. However, instance-level learning in the contrastive learning tends to ignore the semantic relationship among instances and sometimes undesirably repels the anchor from the semantically similar samples, termed as false negatives.

In particular, contrastive learning seeks to learn transformations that embed positive input pairs nearby, while pushing negative pairs far apart. While positive pairs can be generated reliably (e.g., as different views of the same image), it is difficult to accurately establish negative pairs, defined as samples from different images regardless of their semantic content or visual features. A fundamental problem in contrastive learning is mitigating the effects of false negatives.

Accordingly, it is one object of the present disclosure to provide methods and systems for discovering semantic clusters in unlabeled data by simultaneous semantic prompt learning based on a Discriminative Prompt Regularization (DPR) loss and representation calibration based on a Contrastive Affinity Learning (CAL) process. In an embodiment CAL preferably discovers abundant reliable pseudo positives for DPR loss and contrastive loss based on generated affinity graphs. These semantic-aware pseudo labels further enhance the semantic discriminativeness of DPR supervision. In an embodiment DPR regularizes semantic representations of ensembled prompts, which facilitates the discovery of more accurate pseudo labels at the next-step of CAL. A further object is model and prompt representations that are iteratively enhanced, in order to obtain higher quality pseudo positives for further self-training as well as to acquire better semantic clustering.

SUMMARY

An aspect of the present disclosure is a method of fine-grained image categorization, that can include capturing an image by a camera; predicting, via a trained machine learning model, a label for at least one object in the captured image; outputting the predicted label, wherein the trained machine learning model is trained by contrastive affinity learning by processing circuitry configured to retrieve, from an image database, a plurality of images having at least one object; perform, in a warm-up stage, semi-supervised contrastive learning based on projected features of a class token and an ensembled prompt, respectively; at each iteration, in a contrastive affinity learning stage, forward a student model and an exponentially moving averaged (EMA) teacher model with different augmented views of the retrieved images; enqueue teacher embeddings output from the teacher model into a corresponding token-specific memory; and compute semi-supervised contrastive loss on a current batch and a contrastive affinity learning (CAL) loss for student embeddings output from the student model and the teacher embeddings with pseudo-labels from a affinity graph dynamically generated by semi-supervised affinity generation.

A further aspect of the present disclosure is a mobile device system, that can include a camera for capturing an image; mobile device processing circuitry configured to predict, using a trained machine learning model, a label for at least one object in the captured image; display the predicted label in conjunction with the image; machine learning processing circuitry configured to train the machine learning model by contrastive affinity learning including retrieving, from an image database, a plurality of images having at least one object; performing, in a warm-up stage, semi-supervised contrastive learning based on projected features of a class token and an ensembled prompt, respectively; at each iteration, in a contrastive affinity learning stage, forwarding a student model and an exponentially moving averaged (EMA) teacher model with different augmented views of the retrieved images; enqueuing teacher embeddings output from the teacher model into a corresponding token-specific memory; and computing semi-supervised contrastive loss on a current batch and a contrastive affinity learning (CAL) loss for student embeddings output from the student model and the teacher embeddings with pseudo-labels from a affinity graph dynamically generated by semi-supervised affinity generation.

A further aspect of the present disclosure is a system, that can include a plurality of camera equipped devices for capturing images of an object; an image database for storing the captured images; processing circuitry configured to train a machine learning model by contrastive affinity learning including retrieving, from the image database, a plurality of the captured images; performing, in a warm-up stage, semi-supervised contrastive learning based on projected features of a class token and an ensembled prompt, respectively; at each iteration, in a contrastive affinity learning stage, forwarding a student model and an exponentially moving averaged (EMA) teacher model with different augmented views of the retrieved images; enqueuing teacher embeddings output from the teacher model into a corresponding token-specific memory; and computing semi-supervised contrastive loss on a current batch and a contrastive affinity learning (CAL) loss for student embeddings output from the student model and the teacher embeddings with pseudo-labels from a affinity graph dynamically generated by semi-supervised affinity generation.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 15 is an illustration of a non-limiting example of details of computing hardware used in the computing system, according to certain embodiments.

DETAILED DESCRIPTION

Figure 1:
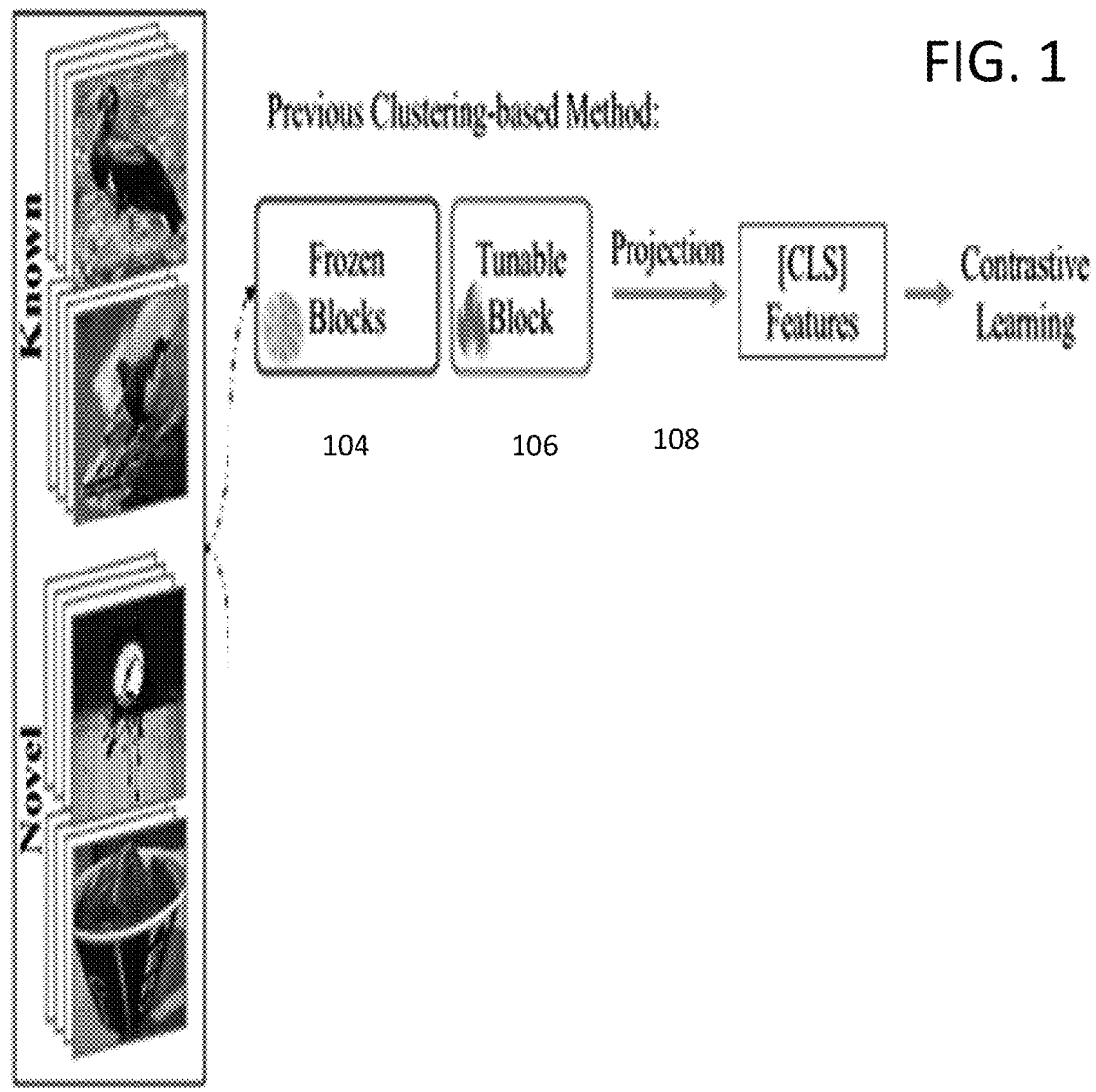
FIG. 1 illustrates a conventional semi-supervised contrastive learning method.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, apparatus, and method for novel category discovery by way of a prompt-based contrastive affinity learning (PromptCAL) that includes: (1) a two-stage framework for the generalized novel category discovery problem, in which semantic prompt tuning and contrastive affinity learning mutually reinforce and benefit each other during the learning process. (2) Two synergistic learning objectives are contrastive affinity loss and discriminative prompt regularization loss, based on semi-supervised adapted affinity graphs to enhance semantic discriminativeness. (3) The learning method has been applied to image identification and fine-grained image identification, for example, aircraft and car identification. (4) In addition, the learning method has been shown to achieve good generalization and even has been shown to be effective in more challenging low-percentage labeling and few-class setups.

Generalized Category Discovery (GCD) has been successfully performed using semi-supervised contrastive learning. FIG. 1 is a block diagram of a conventional method based on semi-supervised contrastive learning. One approach has been to apply semi-supervised contrast learning with labeled and unlabeled images 102 on largescale pre-trained visual transformer 104 (ViT) followed by constraint KMeans 106. See Vaze et al.; David Arthur and Sergei Vassilvitskii. k-means++: The advantages of careful seeding. Technical report, Stanford, 2006; and Paul S Bradley, Kristin P Bennett, and Ayhan Demiriz. Constrained k-means clustering. Microsoft Research, Redmond, 20(0): 0, 2000, each incorporated herein by reference in their entirety. However, GCD with a pre-trained ViT still has limitations: first, the frozen backbone lacks the adaptability to downstream tasks, including contrastive learning 108; and second, abundant false negatives will degenerate the semantic representation. See Tsai-Shien Chen, Wei-Chih Hung, Hung-Yu Tseng, Shao-Yi Chien, and Ming-Hsuan Yang. Incremental false negative detection for contrastive learning. *arXiv preprint arXiv:* 2106.03719, 2021; Huynh et al.; Khorasgani et al.; and Zheng et al., each incorporated herein by reference in their entirety. Furthermore, as supported by empirical studies, abundant false negatives in contrastive learning can deteriorate the compactness and purity of semantic clustering.

Figure 2:
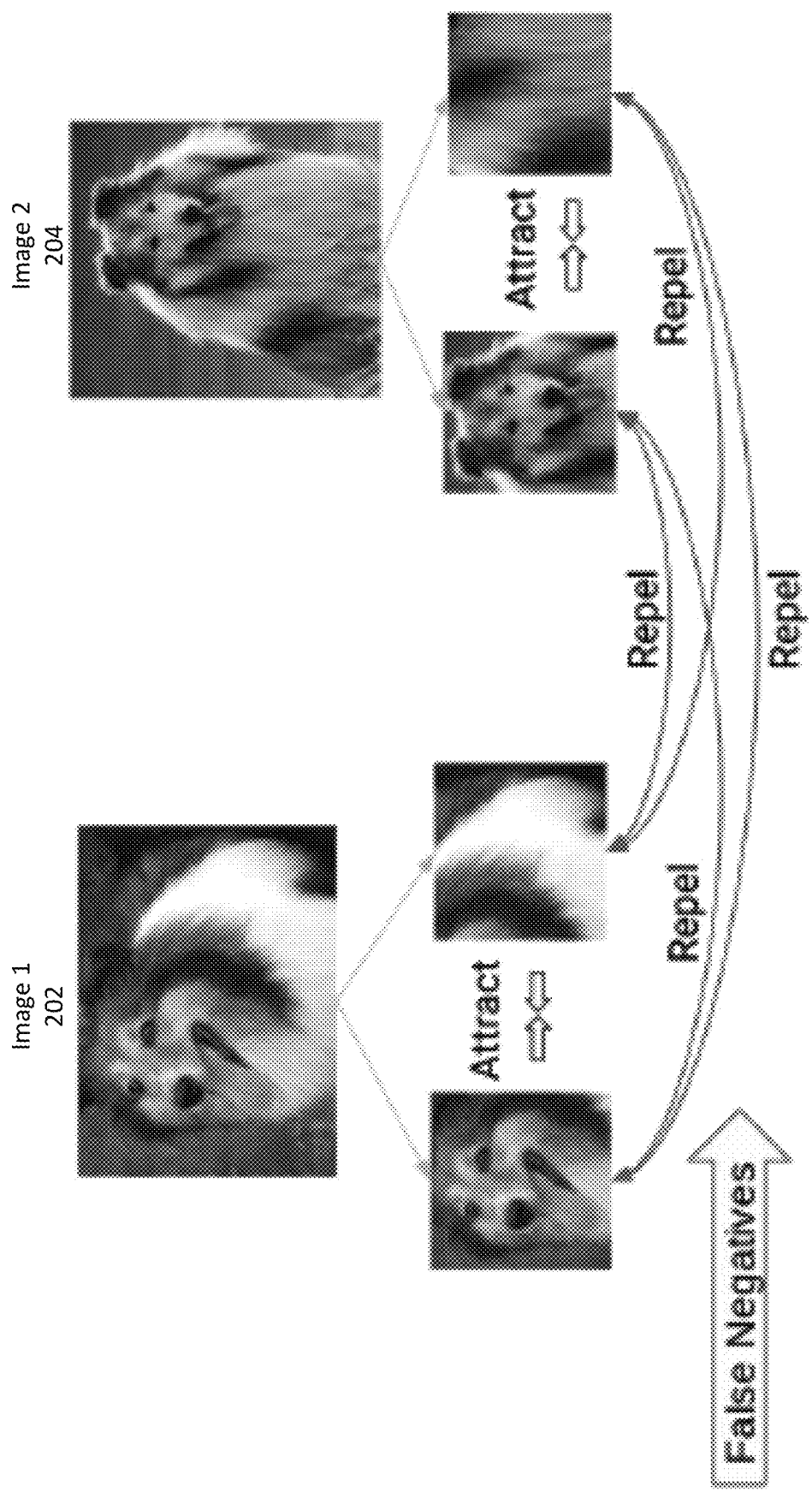
FIG. 2 illustrates the concept of false negatives in contrastive learning.

In order to help in understanding what is meant by false negatives, FIG. 2 illustrates false negatives in the context of contrastive learning. FIG. 2 provides an example that shows that without knowledge of labels, automatically selected negative pairs could actually belong to the same semantic category, creating false negatives.

In particular, in the context of contrastive learning, the embedding space is governed by two opposing forces, the attraction of positive pairs (Attract) and repellence of negative pairs (Repel), effectively actualized through a contrastive loss. Without labels, conventional contrastive learning relies on the instance discrimination task in which positive pairs are defined as different views of the same image, while negative pairs are formed by sampling views from different images, regardless of their semantic information. As shown in FIG. 2, positive pairs generated from different views of the same image are generally reliable since they likely contain similar semantic content or correlated features. However, the creation of valid negative pairs is far more difficult. The conventional approach of defining negative pairs as samples from different images ignores their semantic content. For example, two images of a dog 202, 204 are falsely considered as a negative pair, as seen in FIG. 2.

Contrasting undesirable negative pairs encourages the model to discard their common features through the embedding, which are indeed the common semantic content, e.g., dog features in the example of FIG. 2. Those undesirable negatives are assigned as false negatives, i.e., negative pairs from the same semantic category. Besides disregarding semantic information, false negatives also hinder the convergence of contrastive learning-based objectives due to the appearance of contradicting objectives. For instance, in FIG. 2, the dog's head on the left (image 202) is attracted to its fur (positive pair), but repelled from similar fur of another dog image 204 on the right (negative pair), creating contradicting objectives.

In summary, false negatives are a fundamental problem in contrastive self-supervised learning. Without labels, this problem is very hard to adequately resolve. This problem seeks to learn good semantic representations, but may need certain semantic information to start with.

Figure 3:
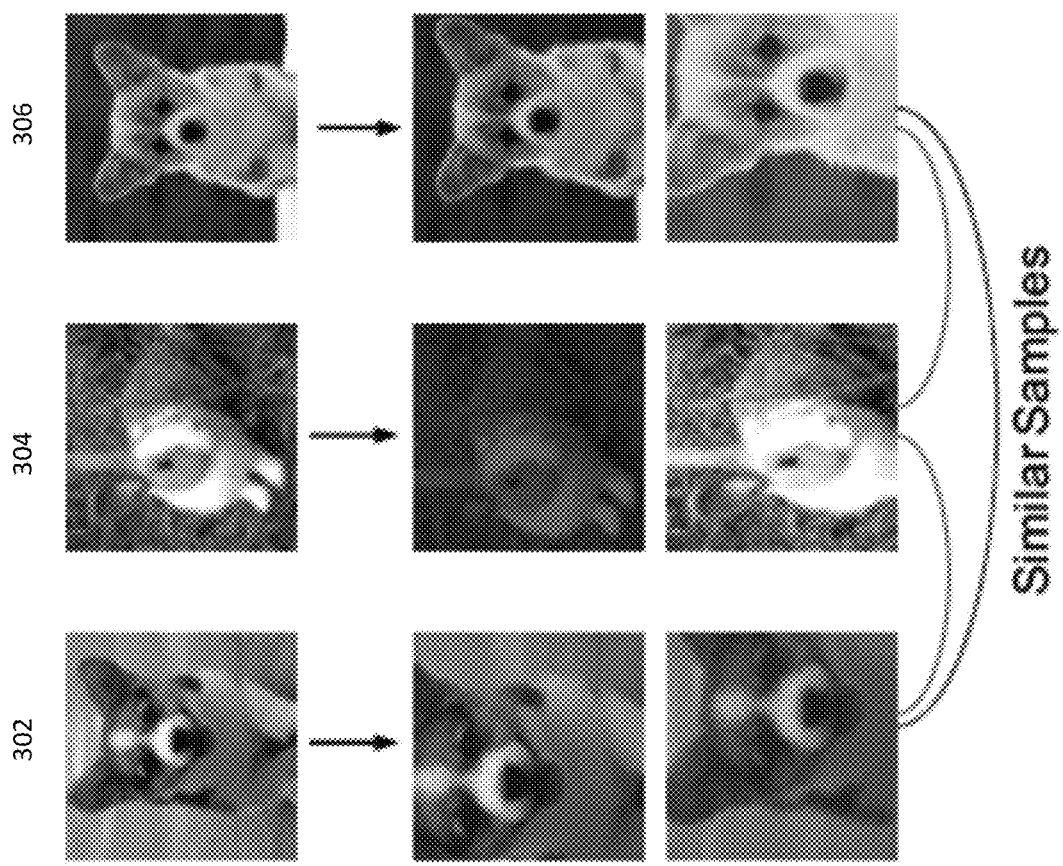
FIG. 3 illustrates the class collision problem.

Most of the conventional contrastive learning frameworks adopt the instance discrimination as the pretext task, which treat every single instance as a different class. However, such a method will inevitably cause class collision. FIG. 3 illustrates an example of the class collision problem. A typical instance discrimination method will treat the first column 302 and the third column 306 as a negative pair since they are different instances. However, the semantic information of the first column 302 and the third column 306 are very similar, and should reasonably be treated as a positive pair.

Identifying particular object classes is a popular use of camera-equipped smartphones. For example, there are apps for identifying a dog breed by its picture. One dog breed identifier app is operated by taking a photo and having an AI model recognize the breed. The AI model generally performs recognition in a remote service. In some cases, the AI model may be trained for mixed breeds. The dog breed identifier app may be accommodated by a big database of breeds. The app may be updated and new breeds may be added to the database.

However, such dog breed identifier app requires labeling of any new dog breed in order to update the app and heavily relies on the big database of breeds.

In a similar manner, some bird identification apps are also operated by taking a photo of a bird and having an AI model perform a comparison with a big database of bird images. Again, bird identification apps require labeling of the bird images.

Apps can range from general animal species identification to specific animal identification. In most known cases, the apps for animal species identification are trained with big databases of labeled images, and continue to expand as new labeled images are added to the database. Even with a very large image database, images taken with smartphone cameras are still taken from perspectives that may be lacking in the database, or may still come across breed images that vary from explicit images in the database. Even images of the same breed of animal may not be included in the database and may not be identified as such.

Most images taken with smartphone cameras are not labeled, but would preferably be added to populate image databases. Self-supervised learning is an approach that can make use of the wealth of unlabeled image data. Improvements to contrastive learning can help achieve discovery of novel breeds by self-supervised learning.

Positive Mining in Neighborhoods. In self-supervised learning mining positives to antagonize the side effect of abundant false negatives in the sample-wise contrastive loss is essential to the downstream performance. See Debidatta Dwibedi, Yusuf Aytar, Jonathan Tompson, Pierre Sermanet, and Andrew Zisserman. With a little help from my friends: Nearest-neighbor contrastive learning of visual representations. In *Proceedings of the IEEE/CVF International Conference on Computer Vision*, pages 9588-9597, 2021; Huynh et al.; Khorasgani et al., Saquib Sarfraz, Vivek Sharma, and Rainer Stiefelhagen. Efficient parameter-free clustering using first neighbor relations. In *Proceedings of the IEEE/CVF Conference on Computer Vision and Pattern Recognition*, pages 8934-8943, 2019; incorporated herein by reference. False negative contrastive learning (FNC) comprehensively analyzes the adverse effect of false-negatives on contrastive learning SoTAs and performs positive mining based on ensembled similarities on local patch pairs. Local aggregation (LA) proposes to learn better representation through soft clusters in neighborhoods at different scales. Local aggregation for unsupervised learning of visual embeddings. In *Proceedings of the IEEE/CVF International Conference on Computer Vision*, pages 6002-6012, 2019, incorporated herein by reference in its entirety. NNCLR, NCL, and WCL conduct positive mining based on K-Nearest Neighbors (KNN) as pseudo positives to improve contrastive learning. See Zhun Zhong, Enrico Fini, Subhankar Roy, Zhiming Luo, Elisa Ricci, and Nicu Sebe. Neighborhood contrastive learning for novel class discovery. In *Proceedings of the IEEE/CVF Conference on Computer Vision and Pattern Recognition*, pages 10867-10875, 2021, incorporated herein by reference. SSL may leverage a graph diffusion algorithm to propagate pseudo labels. See Ahmet Iscen, Giorgos Tolias, Yannis Avrithis, and Ondrej Chum. Label propagation for deep semi-supervised learning. In *Proceedings of the IEEE/CVF Conference on Computer Vision and Pattern Recognition*, pages 5070-5079, 2019, incorporated herein by reference in its entirety. But there exist major differences in comparison to PromptCAL. First, features in the context are prone to open-set noises and thus more challenging than SSL. Second, an efficient online diffusion per iteration is a graph subsampling strategy, while conducting diffusion per epoch on the entire dataset. Third, compute affinity propagation is performed on consensus affinity graph with prior knowledge, while conducting propagation on naive KNN graph. The framework incorporates and generalizes consensus KNN, which was originally built upon non-learnable SIFT features of synthetic datasets, while their method exploits deep features and can guide end-to-end training, which suits the GNCD context. See Vittal Premachandran and Ramakrishna Kakarala. Consensus of k-nns for robust neighborhood selection on graph based manifolds. In *Proceedings of the IEEE conference on computer vision and pattern recognition*, pages 1594-1601, 2013; and David G Lowe. Object recognition from local scale-invariant features. In *Proceedings of the seventh IEEE international conference on computer vision*, volume 2, pages 1150-1157. Ieee, 1999, each incorporated herein by reference in their entirety.

Visual prompt learning originates from the field of Natural Language Processing (NLP). Visual prompt learning (VPT) tunes embedded visual prompts with a frozen pre-trained ViT backbone supervised by downstream objectives, which achieves better transfer. However, based on the experimental analysis, VPT does not exhibit significant benefits especially on fine-grained datasets. An objective is a prompt regularization or a weaker semantic supervision signal, which is distinct from the learning goals of prompt ensembling and prompt composition in NLP. See Zhengbao Jiang, Frank F Xu, Jun Araki, and Graham Neubig. How can we know what language models know? *Transactions of the Association for Computational Linguistics*, 8:423-438, 2020; Timo Schick and Hinrich Sch"utze. Exploiting cloze questions for few shot text classification and natural language inference. *arXiv preprint arXiv:* 2001.07676, 2020; Xu Han, Weilin Zhao, Ning Ding, Zhiyuan Liu, and Maosong Sun. Ptr: Prompt tuning with rules for text classification. *arXiv preprint arXiv:* 2105.11259, 2021; and Liu et al.

The presently disclosed learning method focuses on the GNCD problem. The key challenge of GNCD is to discriminate among novel classes when only the ground truths of known classes are accessible in the training set. Self-supervised pretrained representations are conducive to discovering novel semantics. See Mathilde Caron, Piotr Bojanowski, Armand Joulin, and Matthijs Douze. Deep clustering for unsupervised learning of visual features. In *Proceedings of the European conference on computer vision (ECCV)*, pages 132-149, 2018; Kai Han, Sylvestre-Alvise Rebuffi, Sebastien Ehrhardt, Andrea Vedaldi, and Andrew Zisserman. Automatically discovering and learning new visual categories with ranking statistics. *arXiv preprint arXiv:* 2002.05714, 2020; Vaze et al.; and Zhun Zhong, Enrico Fini, Subhankar Roy, Zhiming Luo, Elisa Ricci, and Nicu Sebe. Neighborhood contrastive learning for novel class discovery. In *Proceedings of the IEEE/CVF Conference on Computer Vision and Pattern Recognition*, pages 10867-10875, 2021, each incorporated herein by reference in their entirety. A typical work on GNCD takes advantage of the large-scale pre-trained visual transformer (ViT), and learns robust clusters for known and novel classes through semi-supervised contrastive learning on downstream datasets. See Gilad Sharir, Asaf Noy, and Lihi Zelnik-Manor. An image is worth 16×16 words, what is a video worth? *arXiv preprint arXiv:* 2103.13915, 2021, incorporated herein by reference. However, the remarkable potential of pre-trained ViT is actually suppressed by this practice, due to the class collision issue induced by abundant false negatives in contrastive loss, i.e., considering different unlabeled images from the same or similar semantic class as false negatives (See FIG. 3). See Mingkai Zheng, Fei Wang, Shan You, Chen Qian, Changshui Zhang, Xiaogang Wang, and Chang Xu. Weakly supervised contrastive learning. In *Proceedings of the IEEE/CVF International Conference on Computer Vision*, pages 10042-10051, 2021, incorporated herein by reference in its entirety. As supported by empirical studies, abundant false negatives in contrastive training can deteriorate the compactness and purity of semantic clustering. See Tri Huynh, Simon Kornblith, Matthew R Walter, Michael Maire, and Maryam Khademi. Boosting contrastive self-supervised learning with false negative cancellation. In *Proceedings of the IEEE/CVF Winter Conference on Applications of Computer Vision*, pages 2785-2795, 2022; Salar Hosseini Khorasgani, Yuxuan Chen, and Florian Shkurti. Slic: Self-supervised learning with iterative clustering for human action videos. In *Proceedings of the IEEE/CVF Conference on Computer Vision and Pattern Recognition*, pages 16091-16101, 2022; and Zheng et al., each incorporated herein by reference in their entirety.

Based on empirical investigation, the inventors have determined that this issue of false negatives in contrastive learning is particularly severe in category discovery. Furthermore, although the existing commonly adopted practice of freezing most parts of the pre-trained backbone can alleviate overfitting on known classes, it constrains the flexibility and adaptability of backbones. Lack of adaptability inhibits models from learning discriminative semantic information on downstream datasets.

As a solution, the Prompt-based Contrastive Affinity Learning (PromptCAL) framework learns better semantically discriminative representations in order to tackle the GNCD problem. The approach aims to discover semantic clusters in unlabeled data by simultaneous semantic prompt learning based on a Discriminative Prompt Regularization (DPR) loss and representation calibration based on Contrastive Affinity Learning (CAL) process. Firstly, CAL discovers abundant reliable pseudo positives for DPR loss and contrastive loss based on generated affinity graphs. These semantic-aware pseudo labels further enhance the semantic discriminativeness of DPR supervision. Secondly, DPR regularizes semantic representations of ensembled prompts, which facilitates the discovery of more accurate pseudo labels at the next-step of CAL. Therefore, as model and prompt representations are iteratively enhanced, a higher quality pseudo positives can be obtained for further self-training as well as acquire better semantic clustering.

Figure 4:
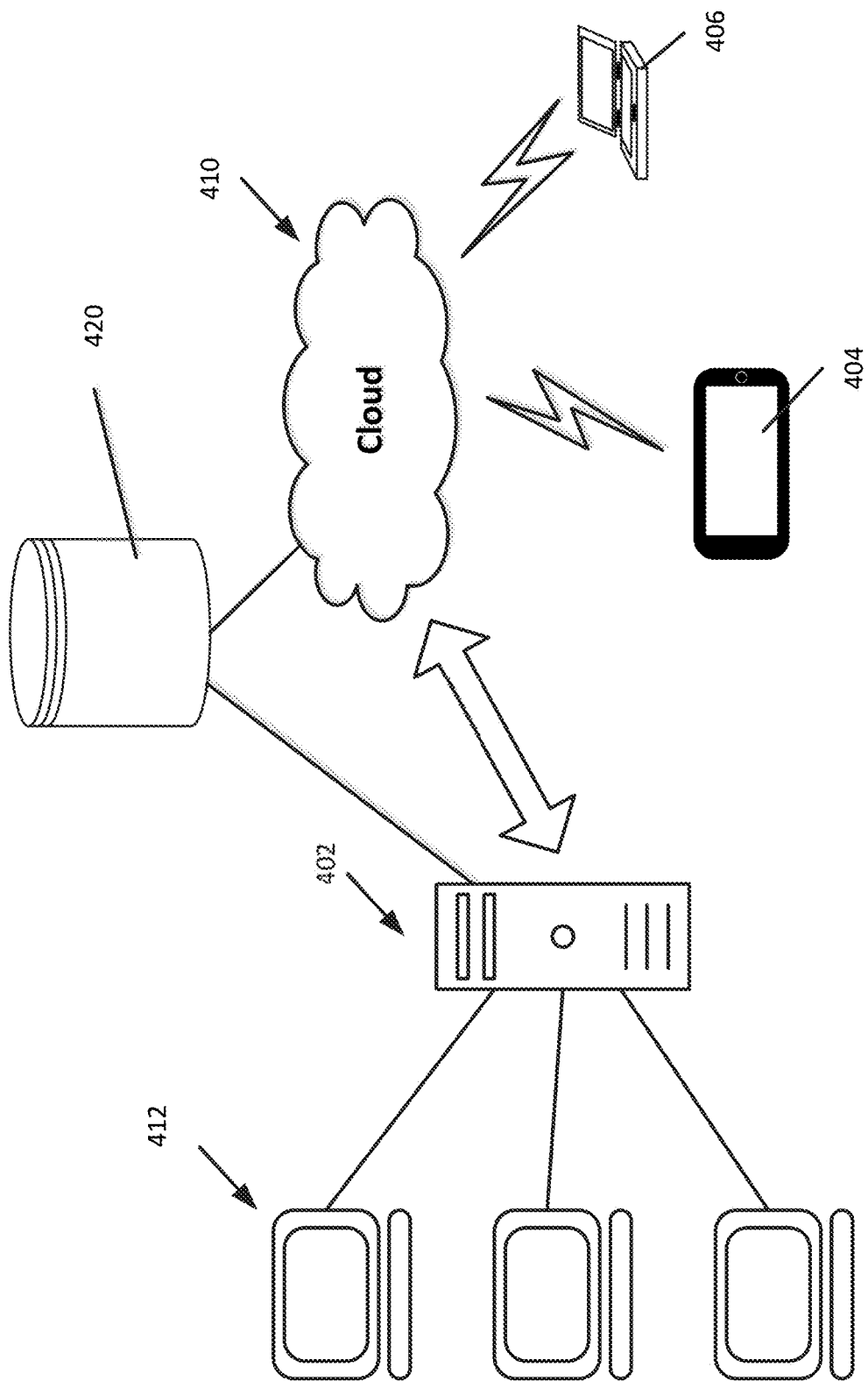
FIG. 4 is a system diagram for category discovery, according to an exemplary aspect of the disclosure.

FIG. 4 is a diagram of a machine learning-based system in accordance with an exemplary aspect of the disclosure. In an exemplary embodiment, a server 402 or artificial intelligence (AI) workstation may be configured for image classification, preferably fine-grained image classification. With such a configuration, one or more client computers 412 may be used to train several image classifiers at a time. In the embodiment, the server 402 may be connected to a cloud service 410. The cloud service 410 may be accessible via the Internet. The cloud service 410 may provide a database system and may store images, such as animal images, car images, aircraft images, for purposes of identification. Mobile devices 404, 406 may access images served by the cloud service 410. The mobile devices may be used to view the images served by the cloud service 410 for use in identification of the object in the image.

An aspect is an image classification recognition service having one or more servers 402 and one or more client computers 412. The image classification recognition service can identify an object in an image.

Another aspect is an image classification software application. The image classification software application may be configured to be invoked by a command and/or function associated with a graphical widget. In addition, images that have been identified may be stored in a database 420 containing identified images. The database 320 may be maintained in a server computer or in a cloud service 410. The database 420 may also store unlabeled images from many mobile devices 404 for purposes of training the machine learning-based image classification system and discover new classes.

In some embodiments, the image classification system of the present disclosure may take the form of a product, such as an image classification device or software application. The image classification device or software application may be incorporated into a network system as middleware that is connected between an image classification service 410 and an end user display device 404, 406.

In some embodiments, an image classification program may be a mobile application that can be installed in a mobile display device 404, 406. The image classification mobile application may inform the user of the mobile display device of the classified image, by for example, displaying an indication message, or outputting an audio sound or voice message, in order to make the user aware of the image that is identified.

Figure 5:
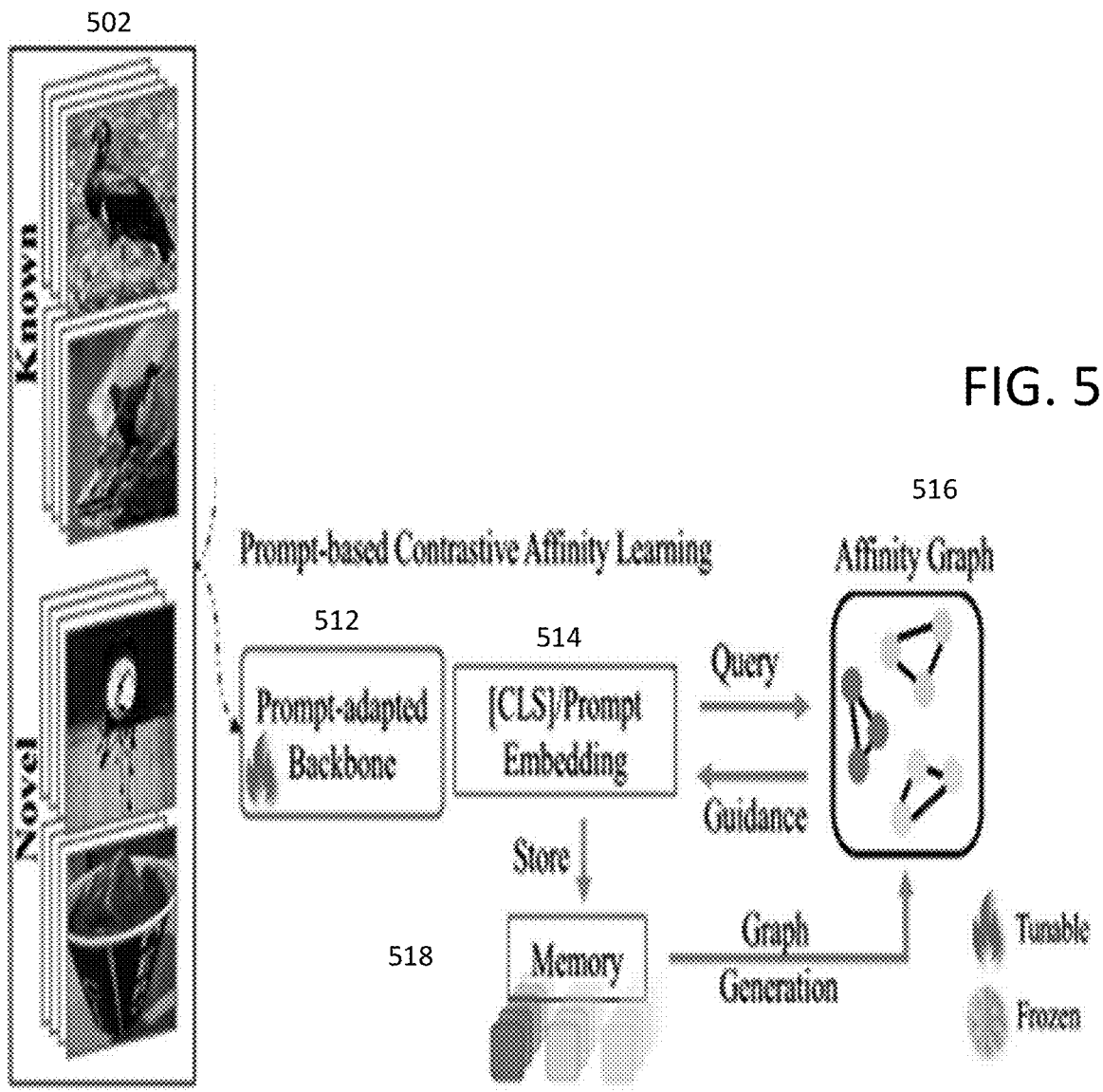
FIG. 5 illustrates an overview of prompt-based contrastive learning, according to an exemplary aspect of the disclosure.

FIG. 5 is a high-level block diagram of PromptCAL. In contrast to the conventional method of FIG. 1, PromptCAL constructs an affinity graph 517 on-the-fly to guide representation learning of the class token and prompts 514. Meanwhile, the prompt-adapted backbone 512 can be tuned to enhance semantic discriminativeness. PromptCAL can discover reliable affinities from a memory bank 518, especially for novel classes. Therefore, the PromptCAL is better task-aligned and discriminative to novel semantic information.

The PromptCAL achieves State-Of-The-Art (SOTA) performance in extensive experimental evaluation on six benchmarks. Specifically, PromptCAL remarkably surpasses previous SOTA by more than 10% clustering accuracy on the fine-grained CUB-200 and StandfordCars datasets; it also significantly outperforms previous SoTAs by nearly 4% on ImageNet-100 and 7% on CIFAR-100. Interestingly, both DPR supervised prompts and unsupervised prompts of PromptCAL can learn semantic discriminativeness, which advances the flexibility of the pre-trained backbone. Furthermore, PromptCAL still achieves the best performance in challenging low-labeling and few-class setups.

A challenging aspect of GNCD in comparison to SSL is clustering novel semantics under both semantic shifts and missing annotations. However, existing methods cannot reliably discover and employ semantic affinities on pre-trained representations. See Zhun Zhong, Enrico Fini, Subhankar Roy, Zhiming Luo, Elisa Ricci, and Nicu Sebe. Neighborhood contrastive learning for novel class discovery. In *Proceedings of the IEEE/CVF Conference on Computer Vision and Pattern Recognition*, pages 10867-10875, 2021. Meanwhile, recent SoTAs lack suitable strategies to adapt the pretrained backbone to learn discriminative semantic information without overfitting on known classes.

To this end, PromptCAL includes two synergistic learning objectives: discriminative prompt regularization (DPR) and contrastive affinity learning (CAL), depicted as two stages. The whole framework is displayed in FIGS. 6A-6C.

In the first stage, the framework learns a warm-up representation for further tuning. It is noted that the DPR loss is applied to both stages for prompt regularization. In the second stage the method discovers reliable pseudo positives on generated affinity embedding graphs based on semi-supervised affinity generation (SemiAG). Next, the contrastive affinity loss on pseudo labels can be generated by online SemiAG with the support of embedding memories.

Figure 6A:
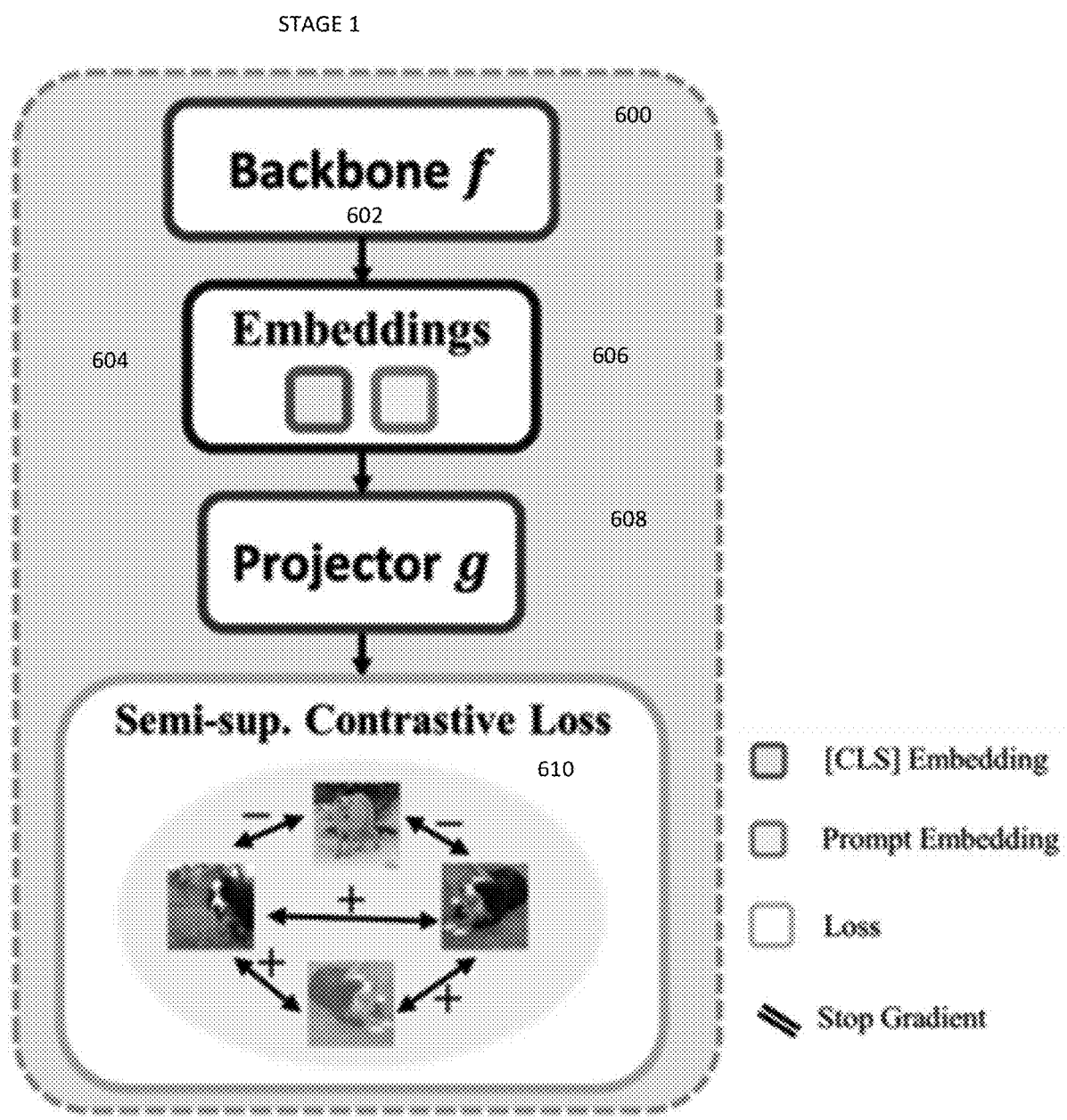
FIGS. 6A, 6B, 6C are a flow diagram for prompt-based contrastive affinity learning. according to an exemplary aspect of the disclosure.
Figure 6B:
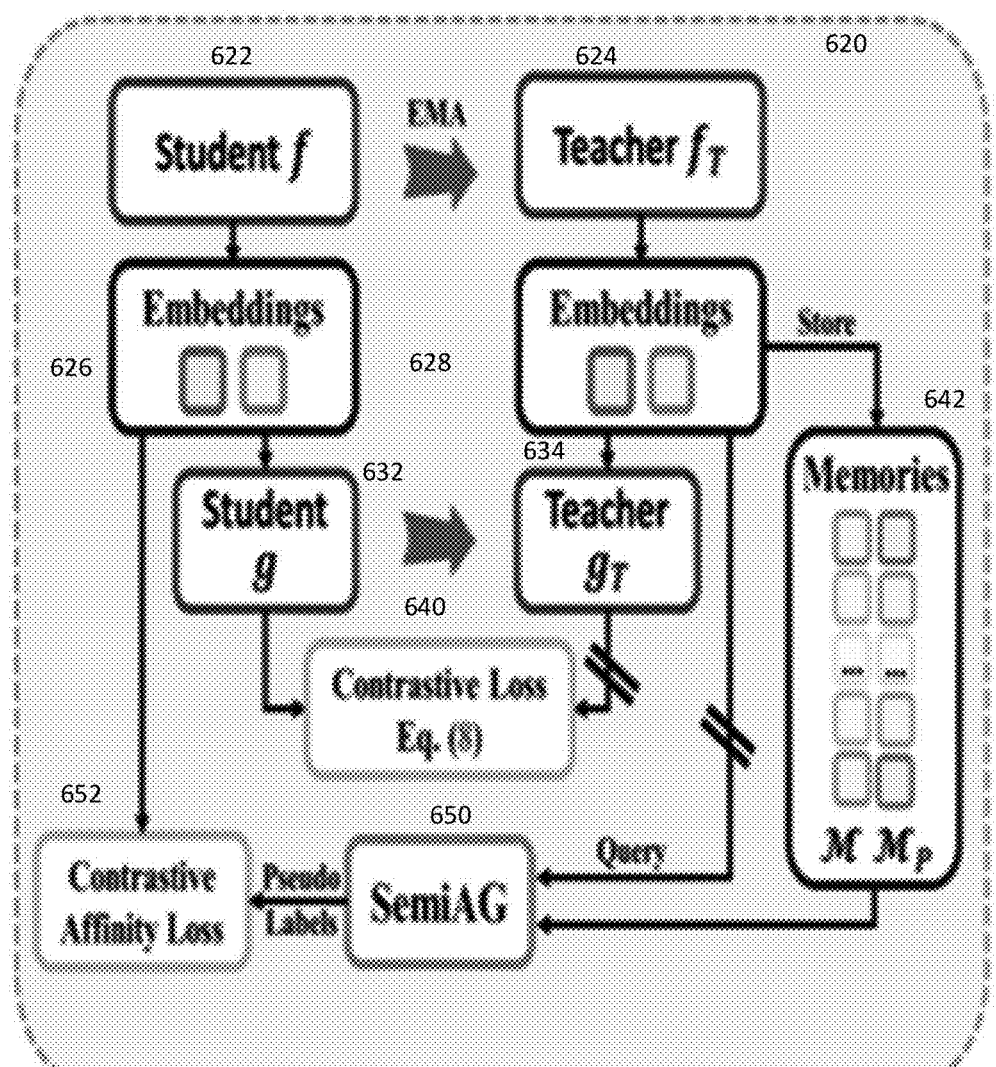
Figure 6C:
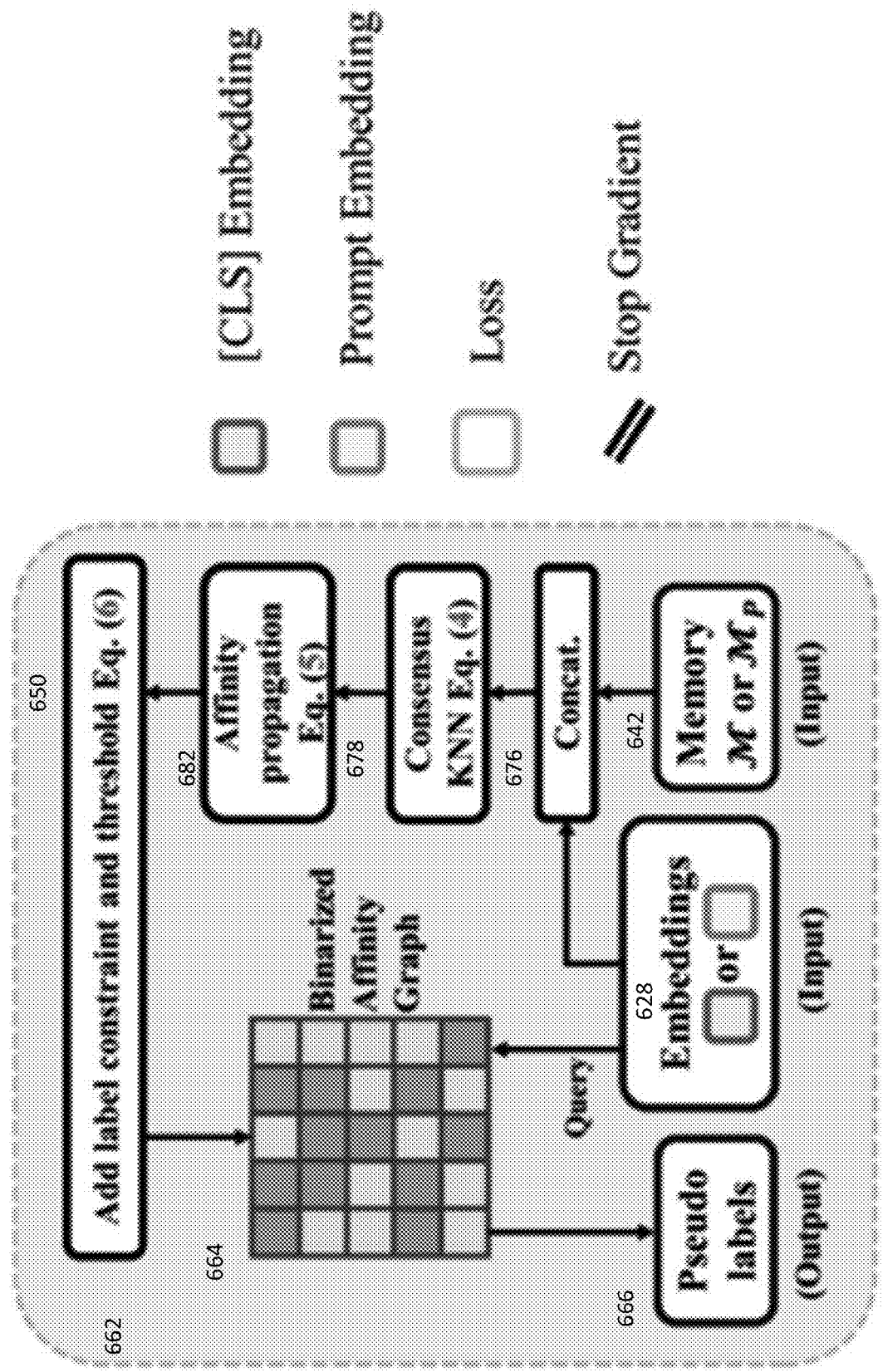

FIGS. 6A-6C illustrate an overview of the PromptCAL framework. The prompt-adapted backbone outputs a class embedding and ensembled prompt embedding. Regarding FIG. 6A, in warm-up training, the method conducts semi-supervised contrastive clustering (Semi-sup. Contrastive Loss) on the projected features of the class token and ensembled prompt, respectively. Regarding FIG. 6B, in the contrastive affinity learning stage, at each iteration, the method forwards the student model and EMA (exponentially moving averaged) teacher with different augmented views of images. Output teacher embeddings are enqueued into their corresponding token-specific memory. The method iteratively computes semi-supervised contrastive loss on the current batch and the contrastive affinity loss for student embeddings and memory embeddings with pseudo-labels from the dynamically generated affinity graph by SemiAG. Regarding FIG. 6C, the method generates affinity graphs for the class embedding and prompt embedding respectively via affinity propagation with label constraints on their corresponding consensus KNN graphs.

Preliminaries

An explanation of the GNCD problem.

The GNCD setting is as follows. Specifically, it is assumed that the training dataset $\mathcal{D} = \mathcal{D}_l \cup \mathcal{D}_u$ comprises two subsets: a labeled set $\mathcal{D}_l = \{x_i, y_i\}_{i=1}^{N_1} \subset \mathcal{X}_l \times \mathcal{Y}_l$ with its label space $\mathcal{Y}_l = \mathcal{C}_{kwn}$, and an unlabeled set $\mathcal{D}_u = \{x_i\}_{i=1}^{N_2} \subset \mathcal{X}_u$ with its underlying label space $\mathcal{Y}_u = \mathcal{C} = \mathcal{C}_{kwn} \cup \mathcal{C}_{new}$. Here, $\mathcal{C}$, $\mathcal{C}_{kwn}$, and $\mathcal{C}_{new}$ denote the label set for All, Known, and New classes, respectively. It is assumed that $|\mathcal{C}|$ is known.

A self-supervised pre-trained ViT can be used as a backbone architecture. The visual prompt-adapted ViT backbone is $f(\cdot|\theta, \theta_p)$ parameterized by prompts $\theta_p$ and last block weights $\theta$. In each mini-batch $\mathcal{B}$, there are two augmented views for each sample. Given a sample vector $x \in \mathcal{B}$, the framework can extract its embedding $h = f(x|\theta, \theta_p) \in \mathcal{H}$ and project h into feature vector $z = g(h|\theta_H) \in \mathcal{Z}$ through a projection head $g(\cdot\theta_H)$ with parameters $\theta_H$. Here, $\mathcal{H}$, $\mathcal{Z}$ denote embedding and feature spaces.

To simplify notations for PromptCAL, the definition of the standard supervised contrastive loss of Khosla et al. is extended to include semi-supervised contrastive loss. See Prannay Khosla, Piotr Teterwak, Chen Wang, Aaron Sarna, Yonglong Tian, Phillip Isola, Aaron Maschinot, Ce Liu, and Dilip Krishnan. Supervised contrastive learning. *Advances in Neural Information Processing Systems*, 33:18661-18673, 2020, incorporated herein by reference in its entirety.

Given a $l_2$-normalized query vector $t_q$ and a set of $l_2$-normalized key vectors $T_k$ (which can be from the embedding or feature space), the contrastive loss is defined as:

$$L_{con}(t_q, T_k; \tau, \mathcal{P}, \mathcal{A}) = -\frac{1}{|\mathcal{P}(t_q)|} \sum_{t_k^+ \in \mathcal{P}(t_q)} \frac{\exp(t_q \cdot t_k^+)}{\sum_{t_a \in \mathcal{A}(t_q)} \exp\left(\frac{t_q \cdot t_a}{\tau}\right)} \quad (1)$$

where $\tau$ is the temperature parameter of the contrastive loss, and · denotes the cosine similarity operation. Here, $\mathcal{P}(t_q)$ and $\mathcal{A}(t_q)$ represent the positive set and anchor set of the query $t_q$, respectively, which are subsets of $T_k$.

Warm-Up Phase with Discriminative Prompt Regularization

Discriminative Prompt Regularization is referenced in FIG. 6A. Although computation overheads are largely reduced by only tuning the last block, it restricts the backbone from better learning semantic representations and adapting to diverse downstream datasets. Counterintuitively, it has been determined that naively adapting backbone with visual prompts overfits small datasets (refer to ablations on CUB-200 below). See Catherine Wah, Steve Branson, Peter Welinder, Pietro Perona, and Serge Belongie. The caltech-ucsd birds-200-2011 dataset. 2011, each incorporated herein by reference in their entirety.

A discriminative prompt regularization (DPR) loss has been constructed that regularizes and forces prompts to learn semantically discriminative features with a task-related auxiliary loss See Chen-Yu Lee, Saining Xie, Patrick Gallagher, Zhengyou Zhang, and Zhuowen Tu. Deeply-supervised nets. In *Artificial intelligence and statistics*, pages 562-570. PMLR, 2015; and Yaming Wang, Vlad I Morariu, and Larry S Davis. Learning a discriminative filter bank within a cnn for fine-grained recognition. In *Proceedings of the IEEE conference on computer vision and pattern recognition*, pages 4148-4157, 2018, each incorporated herein by reference in their entirety. The DPR supervision is investigated on prompt-adapted backbone in an ablation study.

The input prompts are assigned at the last ViT block as [P] tokens (short for prompt), the output of which are ensembled and supervised by a task-related clustering loss in both training stages. All the remaining prompts are unsupervisedly learned, which provides the backbone 602 with extra flexibility. Concretely, the average the $l_2$-normalized output embeddings 606 of all [P] tokens is applied to an ensembled embedding $h_P$ (the same shape as the class embedding 604), and forward it to the projection head 608 and obtain $z_P$. Finally, the DPR task-related loss function 610 is defined on $h_P/z_P$ as the same form of the loss defined on h/z but with a weaker weight $\gamma$.

Since randomly initialized prompts are not ready for contrastive affinity learning, a warm-up training is included to prepare the class token and prompts with dataset-specific representation. The overall training objective in this stage is formulated as:

$$L_1(x) = L_{semi}^{CLS}(z) + \gamma L_{semi}^{P}(z_P) \quad (2)$$

where $L_{semi}^{CLS}$ and $L_{semi}^{P}$ represent the semi-supervised contrastive loss 610 (SemiCL) on [CLS] and its DPR counterpart on [P], respectively. Here, $\gamma$ is DPR loss weight.

Further, based on extended contrastive loss (Eq. 1), the SemiCL on [CLS] feature $z \in \mathcal{B}$ is written as:

$$L_{semi}^{CLS}(z) = (1-\alpha)L_{con}(z, Z_\mathcal{B}; \tau, \mathcal{P}_{self}, \mathcal{A}_{self}) + \quad (3)$$
$$\alpha L_{con}(z, Z_{\mathcal{B}_1}; \tau_\alpha, \mathcal{P}_{sup}, \mathcal{A}_{sup})\mathbb{1}(z \in Z_{\mathcal{B}_1})$$

where $\tau$, $\tau_\alpha$ are temperature parameters, and $\|$ is an indicator function. The first and second terms denote self-supervised and supervised contrastive loss on projected features of an entire batch $\mathcal{B}$ and only labeled samples $\mathcal{B}_1$, respectively. $\mathcal{P}_{self}(z)$ is defined as the augmented counterpart of z in $\mathcal{B}$, and $\mathcal{P}_{sup}(z)$ is defined as all other features in $\mathcal{B}$, that shares the same class label with z. See Kaiming He, Haoqi Fan, Yuxin Wu, Saining Xie, and Ross Girshick. Momentum contrast for unsupervised visual representation learning. In *Proceedings of the IEEE/CVF conference on computer vision and pattern recognition*, pages 9729-9738, 2020; and Prannay Khosla, Piotr Teterwak, Chen Wang, Aaron Sarna, Yonglong Tian, Phillip Isola, Aaron Maschinot, Ce Liu, and Dilip Krishnan. Supervised contrastive learning. *Advances in Neural Information Processing Systems*, 33:18661-18673, 2020, each incorporated herein by reference in their entirety. Besides, $\mathcal{A}_{sup}(z) = \mathcal{B}_1 - \{z\}$ and $\mathcal{A}_{self}(z) = \mathcal{B} - \{z\}$. Similar to Eq. 3, the DPR loss function $L_{semi}^{P}$ is defined on ensembled prompt feature $z_P$ in the overall loss (Eq. 2).

Semi-Supervised Affinity Generation

Once the warmed-up semantic representation for the class token and prompts are obtained, abundant positive samples can be discovered by reliable pseudo-labeling methods for enhanced clustering and supervision signals at next iteration. However, pseudo-labeling techniques in recent works (e.g., naive nearest neighbors, pair-wise predictions as positives) are not robust enough to semantic shifts. See Zhun Zhong, Enrico Fini, Subhankar Roy, Zhiming Luo, Elisa Ricci, and Nicu Sebe. Neighborhood contrastive learning for novel class discovery. In *Proceedings of the IEEE/CVF Conference on Computer Vision and Pattern Recognition*, pages 10867-10875, 2021; and Avital Oliver, Augustus Odena, Colin A Raffel, Ekin Dogus Cubuk, and Ian Goodfellow. Realistic evaluation of deep semi-supervised learning algorithms. *Advances in neural information processing systems*, 31, 2018, each incorporated herein by reference in their entirety. To address this issue, a semi-supervised affinity generation method 650, as in FIG. 6C, is used under the assumption that consensus local neighbors share the same semantics. Specifically, the method first constructs a consensus affinity graph in $\mathcal{H}$ based on neighborhood statistics. See Premachandran and Kakarala. Then, the method conducts affinity propagation on the entire graph to calibrate affinities. Lastly, the method incorporates the semi-supervised priori from $\mathcal{D}_l$ into the graph. These steps are explained below. An illustrative example is presented in FIG. 7. The workflow of SemiAG operations 650 is presented in FIG. 6C.

Figure 7:
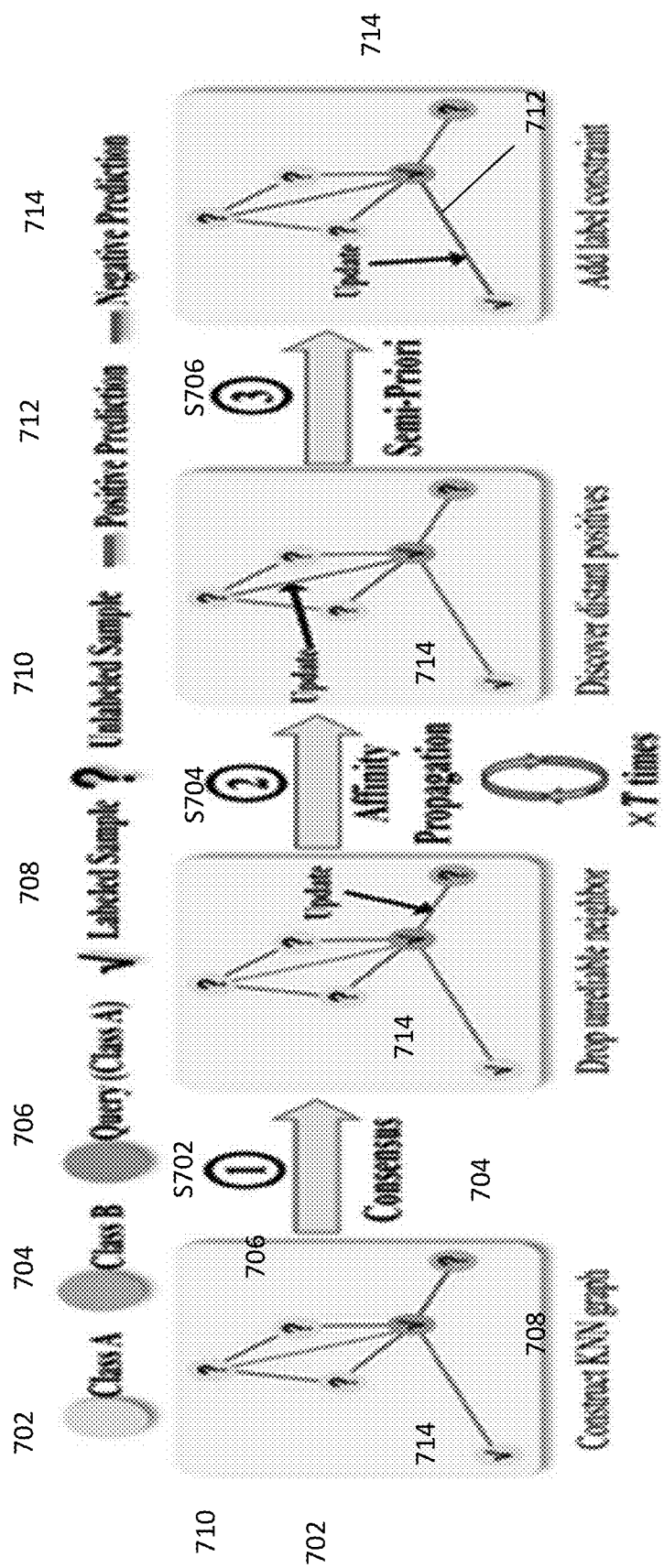
FIG. 7 is a flow diagram for semi-supervised affinity generation, according to an exemplary aspect of the disclosure.

FIG. 7 illustrates an intuitive example for SemiAG, which sequentially requires three operations (S702, S704, S706). The relative pairwise distances are proportional to cosine distances in the embedding space. Each of the four graphs denotes results obtained at each step after binarization with thresholds. Each operation can either remove false positives or retrieve ground-truth positives for the query embedding (706). A Class A is denoted by 702. A class B is denoted by 704. A labeled sample 708 is denoted by a checkmark. An unlabeled sample 710 is denoted by a ? symbol. A positive prediction is denoted by 712. A negative prediction is denoted by 714.

Firstly, in S702, only reliable neighbors are retrieved as positives based on consensus information; secondly in S704, more positives are retrieved by affinity propagation on the entire graph; and thirdly, in S706, pairwise constraints in label information of labeled data (SemiPriori) are incorporated for affinity calibration Consensus KNN graph (678). Given an embedding graph $G_H=(\mathcal{V}, \varepsilon)$ whose node set $\mathcal{V}=\{h_i\}_{i=1}^{N_G}$ contains $N_G$ embeddings and edge set is $\varepsilon=\{e_{i,j}=h_i \cdot h_i \cdot h_j\}_{i,j=1}^{N_G}$, a consensus graph 678 $G_c=\{g_{i,j}\}_{i,j=1}^{N_G}$ is built on $\mathcal{V}$ via consensus statistics. Each edge $g_{i,j}$ of $G_c$ is defined as:

$$g_{i,j} = \begin{cases} |h_c|h_i, h_j \in O_K(h_c)), \forall h_b \in \mathcal{V}| & i \neq j \\ 0 & i \neq j \end{cases} \quad (4)$$

where $O_K(h_c)=\arg\text{top}K_{h_j}(\{h_j \cdot h_c | h_j \in \mathcal{V}\})$ denotes the K-neighborhood of $h_c \in \mathcal{V}$. Then, the method converts it into $\tilde{G}_c$ by row normalization. However, it has been determined that the consensus graph has a defect: in that the neighborhood consensus condition is rigorous and only considers local information, which means abundant potential positives are still unretrieved.

Affinity propagation with SemiPriori (682), to overcome this issue, a graph diffusion algorithm is leveraged on the probabilistic matrix $\tilde{G}_c$ to propagate local affinities along multi-hop paths to characterize higher-order structural information and avoid degenerated solutions. See Xingwei Yang, Lakshman Prasad, and Longin Jan Latecki. Affinity learning with diffusion on tensor product graph. *IEEE transactions on pattern analysis and machine intelligence*, 35(1): 28-38, 2012, incorporated herein by reference in its entirety. Specifically, the tensor product graph (TPG) diffusion algorithm is applied, which iteratively computes the diffused graph $\tilde{G}_c$ as:

$$\tilde{G}_d^{(t+1)} = \tilde{G}_c \tilde{G}_d^{(t)} \tilde{G}_c^{(T)} + I, t = 1, \ldots, n \quad (5)$$

where I is an identity matrix, and $\eta$ is the total diffusion step. $\tilde{G}_d^{(t)}$ denotes the t-th step diffused graph and $\tilde{G}_d^{(0)}=\tilde{G}_c$. Denote the final diffused graph as $\tilde{G}_d$.

However, it has been determined that the consensus graph 678 and affinity propagation 682 neglect abundant prior information in the labeled data. To address the issue, a SemiPriori (662) is incorporated, i.e., add sample-wise class labels as pairwise constraints to $\tilde{G}_d$. The edge is set to 1 if two nodes have the same labels (i.e., $y_i=y_j$) and prune the edge if $y_i \neq y_j$. Meanwhile, sparsify $\tilde{G}_d$ with a pre-defined quantile q, then the generated binarized affinity graph $G_b$ 664 is denoted as:

$$G_b(i,j) = \begin{cases} 1 & (y_i \neq y_j) \vee (\tilde{G}_d(i,j) > q) \\ 0 & (y_i \neq y_j) \end{cases} \quad (6)$$

On binarized affinity graph Gb 664, positive/negative pairs are regarded as reliable pseudo positives/negatives in noisy embedding space for further contrastive affinity learning. Therefore, pseudo-labels 666 of both labeled and unlabeled data are computed; while, those of labeled data are calibrated by SemiPriori 662. Note that two binarized graphs 664 are computed for [CLS] and [P] embeddings, respectively.

Contrastive Affinity Learning Phase (620)

Given reliable pseudo positives identified from an embedding graph, two critical components are introduced for the second phase learning: online graph sampling strategy and CAL loss. The overall framework of contrastive affinity learning is illustrated in FIG. 6B.

It has been determined that one practical issue arises: SemiAG on mini-batches is not effective due to sampling insufficiency; while conducting SemiAG offline on the entire dataset is time-consuming and memory inefficiency To strike a balance between the graph size and computation resources the learning phase dynamically constructs a sub-graph $G'_H$ sub-sampled from the entire graph $G_H$ supported by an extra embedding memory bank 642 $\mathcal{M}$ and an exponentially moving averaged (EMA) teacher 624 (fr; gr), like MoCo. See Jure Leskovec and Christos Faloutsos. Sampling from large graphs. In *Proceedings of the 12th ACM SIGKDD international conference on Knowledge discovery and data mining*, pages 631-636, 2006; incorporated herein by reference.

Specifically, for each input batch, the EMA teacher 624 produces stable embeddings 628, which are enqueued to a fixed-size first-in-first-out memory 642. The sub-graph $G'_H$ is then constructed by the embeddings in the memory 642 and teacher embeddings 628 in the current batch. The method denotes its node set as $\mathcal{V}(G'_H)=\mathcal{M} \cup \{h_T-f_T(x)|x \in \mathcal{B}\}$. In this way, the same SemiAG 650 operation is applied to the sub-graph on the fly with adjustable memory sizes. Note that the method maintains another memory for SemiAG on prompts, since it retains DPR loss in contrastive affinity learning phase.

Contrastive affinity loss (CAL 652); the target of CAL loss 652 is to gradually calibrate the semantic representation by learning from generated affinity constraints in graphs. Given the sub-graph $G'_H$ and its corresponding binarized graph 664 $G'_b$ by SemiAG, the method formulates CAL loss 652 with [CLS] embedding $h_i$ as a query, embeddings in sub-graph node set $\mathcal{V}(G'_H)$ as keys:

$$L_{CAL}^{CLS}(h_i, G'_b) = L_{con}(h_i, \mathcal{V}(G'_H), \tau_a, \mathcal{P}_a, \mathcal{A}_a) \quad (7)$$

where $\tau_a$ is a hyper-parameter, and the positive set is defined as $\mathcal{P}_a(h_i)=\{h_{T,j}|G'_b(i,j)=1, \forall h_{T,j} \neq 1 \in \mathcal{V}(G'_H)\} \cup \{h'_{T,i}\}$ where $h'_{T,i}$ is $h_i$ augmented counterpart. Note that $\mathcal{P}_a$ is always non-empty. Since the whole $\mathcal{V}_a(G'_b)$ is too large, the anchor set $\mathcal{A}_a(h_i)$ is defined as the union of $\mathcal{P}_a(h_i)$ and $N_{neg}$ randomly sampled pseudo-negatives for each query. For $L_{CAL}^{CLS}$ loss, also define its corresponding DPR counterpart of CAL loss as $L_{CAL}^P$.

An overall optimization objective; at CAL stage 620, the method also preserves SemiCL loss in feature space to retain the model capability of instance-wise discrimination. To further increase the consistency between the teacher 634 and student 632, the method adapts supervised and self-supervised term of SemiCL 640 (Eq. 3) as:

$$L_{self}^{CLS}(z) = L_{con}(z, Z_{\mathcal{B},T}; \tau, \mathcal{P}_{self}, \mathcal{A}_{self}) \quad (8)$$

$$L_{sup}^{CLS}(z) = L_{con}(z, Z'_{\mathcal{B}1,T}; \tau_a, \mathcal{P}_{sup}, \mathcal{A}_{sup})\mathbb{I}(z \in Z_{\mathcal{B}1})$$

Here, the method uses student feature z as a query and teacher features $Z_{B,T}$; $Z_{B\ 1,T}$ as keys to strengthen consistencies. The positive and anchor sets follow the same definition as in Eq. (3) but are defined in the teacher feature space.

Then, the overall loss for [CLS] token at CAL stage 620 is formulated as:

$$L_2^{CLS} = (1-a)L_{sup}^{CLS} + a(\beta L_{CAL}^{CLS} + (1-\beta)L_{sef}^{CLS}) \quad (9)$$

where $\beta$ is an adjustable weight. Its corresponding DPR counterpart can be similarly defined, denoted as $L_2^P$.

Finally, since DPR is adopted at CAL stage 620, the overall optimization objective is formulated as:

$$L_2 = L_2^{CLS} + \gamma L_2^P \quad (10)$$

During the inference, the [CLS] embeddings are adopted as final predictions.

Examples

Datasets

PromptCAL was evaluated on three generic datasets (i.e., CIFAR-10/100 and ImageNet-100) and three finegrained datasets (i.e., CUB-200, StandfordCars, and Aircraft. See Alex Krizhevsky, Geoffrey Hinton, et al. Learning multiple layers of features from tiny images. 2009; Alex Krizhevsky, Ilya Sutskever, and Geoffrey E Hinton. Imagenet classification with deep convolutional neural networks. *Communications of the ACM*, 60(6): 84-90, 2017; Jonathan Krause, Michael Stark, Jia Deng, and Li Fei-Fei. 3d object representations for fine-grained categorization. In *Proceedings of the IEEE international conference on computer vision workshops*, pages 554-561, 2013; and Subhransu Maji, Esa Rahtu, Juho Kannala, Matthew Blaschko, and Andrea Vedaldi. Fine-grained visual classification of aircraft. *arXiv preprint arXiv:* 1306.5151, 2013, each incorporated herein by reference in their entirety. A summary of datasets is listed below. For each dataset, the method first subsamples $|C_{kwn}|$ known classes from all classes. Then, a pre-defined ratio of images for known classes are sampled to form the labeled set $\mathcal{D}_l$. Follow GCD, the method sets a labeling ratio to 80% for CIFAR-100 and 50% for other datasets unless otherwise specified. See Vaze et al. All unsampled images constitute $\mathcal{D}_u$. In practice, the method adopts the same dataset split of $\mathcal{D}_l$ and $\mathcal{D}_u$ as in Vaze et al. (See Table 6 for more details on known class numbers and labeling ratios for all dataset). Besides, the method adopts fewer $|C_{kwn}|$ and smaller labeling ratios in more challenging setups for ablation study.

Evaluation Protocol

A GCD evaluation protocol is followed in all experiments unless otherwise specified. See Vaze et al. Specifically, the protocol performs SemiKMeans clustering on the predicted embeddings. Then, all clusters are mapped through the optimal assignment solved by Hungarian algorithm to their ground-truth classes. See MB Wright. Speeding up the hungarian algorithm. *Computers & Operations Research*, 17(1): 95-96, 1990, incorporated herein by reference in its entirety. The accuracy scores for All, Known, and New classes are reported. The predicted embeddings from the student class token are evaluated during inference.

Implementation Details

Following GCD, the method uses ViT-B/16 pre-trained DINO on ImageNet-1K as the backbone for evaluation. See Mathilde Caron, Hugo Touvron, Ishan Misra, Hervé Jégou, Julien Mairal, Piotr Bojanowski, and Armand Joulin. Emerging properties in self-supervised vision transformers. In *Proceedings of the IEEE/CVF International Conference on Computer Vision*, pages 9650-9660, 2021; incorporated herein by reference. For all experiments, the batch size is fixed to 128 and uses the same data augmentation strategies as Vaze et al.

Results

Evaluation on generic datasets. Both stages of PromptCAL are evaluated on three generic datasets (i.e., CIFAR-10/100, and ImageNet-100). Table 1 shows that PromptCAL consistently and significantly surpasses previous SoTAs, i.e., ViT-adapted ORCA, the baseline GCD, and adapted NCD SOTA methods (UNO+ and RankStats+) in terms of overall accuracy on all three datasets. Specifically, PromptCAL surpasses GCD by 6.4% on CIFAR-10, 8.2% on CIFAR-100, and 9.0% ImageNet-100 on All classes; it also remarkably outperforms ORCA by 7% on CIFAR-100 and 3.9% on ImageNet-100. Besides, in contrast to ORCA and UNO+ which suffer from severe overfitting on Known classes, PromptCAL manifests substantial advantages over other methods on New classes (about 10% improvements on three datasets).

TABLE 1

Evaluation on three generic datasets. Accuracy scores are reported.

| Method | CIFAR-10 | | | CIFAR-100 | | | ImageNet-100 | | |
|---|---|---|---|---|---|---|---|---|---|
| | All | Known | New | All | Known | New | All | Known | New |
| KMeans | 83.6 | 85.7 | 82.5 | 52.0 | 52.2 | 50.8 | 72.7 | 75.5 | 71.3 |
| RankStats+ | 46.8 | 19.2 | 60.5 | 58.2 | 77.6 | 19.3 | 37.1 | 61.6 | 24.8 |
| UNO+ | 68.6 | 98.3 | 53.8 | 69.5 | 80.6 | 47.2 | 70.3 | 95.0 | 57.9 |
| GCD | 91.5 | 97.9 | 88.2 | 73.0 | 76.2 | 66.5 | 74.1 | 89.8 | 66.3 |
| ORCA† | 96.9 | 95.1 | 97.8 | 74.2 | 82.1 | 67.2 | 79.2 | 93.2 | 72.1 |
| PromptCal-$1^{st}$ (Ours) | 97.1 | 97.7 | 96.7 | 76.0 | 80.8 | 66.6 | 75.4 | 94.2 | 66.0 |
| PromptCal-$2^{nd}$ (Ours) | 97.9 | 96.6 | 98.5 | 81.2 | 84.2 | 75.3 | 83.1 | 92.7 | 78.3 |

†denotes adapted methods.
Both stages of Prompt-CAL are evaluated.

See Arthur and Vassilvitskii; Han et al. (2020); Fini et al.; Vaze et al., and Cao et al.

By comparing the $1^{st}$ stage (PromptCAL-$1^{st}$) with the $2^{nd}$ stage (PromptCAL-2nd), a major performance boosts is observed, especially on New classes. In addition, it can be seen that both stages of PromptCAL have significant contributions to the final performance on generic datasets. Specifically, PromptCAL-$1^{st}$ improves 5.6% and 3.0% over GCD on CIFAR-10/100, respectively; while the PromptCAL-$2^{nd}$ further improves by 5.2% and 9.0% on CIFAR-100 and ImageNet-100, respectively. Besides, the method also achieves ~7% boost of overall accuracy on CIFAR-100 and 4% on ImageNet-100 when compared with ORCA. Therefore, the above results validate advantages and effectiveness of the two-stage PromptCAL in category discovery.

Evaluation on fine-grained datasets includes results on fine-grained datasets that are reported to demonstrate the PromptCAL effectiveness in Table 2. Apparently, the low performance of KMeans illustrates the challenging nature of fine-grained category discovery caused by larger intraclass and lower inter-class variations. Notice that ORCA performance degrades substantially on three fine-grained datasets. In contrast, the PromptCAL consistently exceeds NCD SOTA and ORCA, and outperforms GCD by ~11% on All classes on CUB-200 and StanfordCars and ~7% on Aircraft. Different from results in Table 1, the results on fine-grained datasets show that the major performance gain of PromptCAL originates from the $2^{nd}$ CAL stage. Noticeably, PromptCAL-$1^{st}$ performance even drops compared with GCD on CUB-200 and Aircraft datasets; while, PromptCAL-$2^{nd}$ achieves remarkable and consistent improvements, especially on New classes.

pseudo labeling at CAL stage; while, the last row represents the full SemiAG setup. The $2^{nd}$, $3^{rd}$, and $4^{th}$ row represent PromptCAL without semi-supervised contrastive loss, semi-supervised prior knowledge (Sec. 3.3), and affinity propagation (Sec. 3.3), respectively. From the results, it can be observed that incorporating each component has a clear contribution: (a) Naive KNN severely overfits Known and performs poorer (with nearly 2.8% and 7.0% accuracy drops on All and New classes, respectively) than SemiAG, due to its susceptibility to noisy neighborhoods. (b) Affinity propagation is the most consequential component (improving by 8.3% on All and 13% on New), which proves the importance of counteracting adverse effects of false negatives in contrastive loss by retrieving more reliable positives. (c) Retaining SemiCL is beneficial, which is because it can push away noisy pseudo positive samples and, thus, prevent overfitting and degenerated solutions. (d) SemiPriori further benefits overall performance by about 5.6% on All and 7% on New, which manifests the importance of incorporating the prior knowledge to calibrate pseudo labels.

TABLE 3

Ablation study on effectiveness of SemiAG in CAL stage on CUB-200 dataset.

|   | cKNN | AP | SemiPriori | SemiCL | All | Known | New |
|---|---|---|---|---|---|---|---|
| (1) | ✗ | ✗ | ✓ | ✓ | $60.1^{-2.8}$ | $70.1^{+5.7}$ | $55.1^{-7.0}$ |
| (2) | ✓ | ✓ | ✓ | ✗ | $61.7^{-1.2}$ | $63.6^{-0.8}$ | $60.7^{-1.4}$ |
| (3) | ✓ | ✓ | ✗ | ✓ | $57.3^{-5.6}$ | $61.8^{-2.6}$ | $55.1^{-7.0}$ |

TABLE 2

Evaluation on three fine-grained datasets. Accuracy scores are reported.

| | CUB-200 | | | StanfordCars | | | Aircraft | | |
|---|---|---|---|---|---|---|---|---|---|
| Method | All | Known | New | All | Known | New | All | Known | New |
| KMeans | 34.3 | 38.9 | 32.1 | 12.8 | 10.6 | 13.8 | 12.9 | 12.9 | 12.8 |
| RankStats+ | 33.3 | 51.6 | 24.2 | 28.3 | 61.8 | 12.1 | 27.9 | 55.8 | 12.8 |
| UNO+ | 35.1 | 49.0 | 28.1 | 35.5 | 70.5 | 18.6 | 28.3 | 53.7 | 14.7 |
| GCD | 51.3 | 56.6 | 48.7 | 39.0 | 57.6 | 29.9 | 45.0 | 41.1 | 46.9 |
| ORCA† | 36.3 | 43.8 | 32.6 | 31.9 | 42.2 | 26.9 | 31.6 | 32.0 | 31.4 |
| PromptCal-$1^{st}$ (Ours) | 51.1 | 55.4 | 48.9 | 42.6 | 62.8 | 32.9 | 44.5 | 44.6 | 44.5 |
| PromptCal-$2^{nd}$ (Ours) | 62.9 | 64.4 | 62.1 | 50.2 | 70.1 | 40.6 | 52.2 | 52.2 | 52.3 |

†denotes adapted methods.
Both stages of PromptCAL are evaluated.

See Arthur and Vassilvitskii; Han et al. (2020); Fini et al.; Vaze et al., and Cao et al.

Ablation and Analysis

In this section, extensive ablation experiments are conducted to reveal and investigate contributions of each component. Next, in-depth analysis are presented on the effectiveness of SemiAG and the effect of visual prompts in PromptCAL is discussed. Further, an explanation is provided as to how PromptCAL performs in more challenging and real-world scenarios with lower-labeling and fewer-classes.

Effectiveness of contrastive affinity learning. As mentioned above, SemiAG dominates the large improvements of PromptCAL. First, ablation experiments are conducted on SemiAG in CAL stage, in Table 3. The $1^{st}$ row denotes the performance of using naive KNN with SemiPriori for TABLE 3-continued Ablation study on effectiveness of SemiAG in CAL stage on CUB-200 dataset.

|   | cKNN | AP | SemiPriori | SemiCL | All | Known | New |
|---|---|---|---|---|---|---|---|
| (4) | ✓ | ✗ | ✓ | ✓ | $54.6^{-8.3}$ | $65.5^{+1.1}$ | $49.1^{-13.0}$ |
| (5) | ✓ | ✓ | ✓ | ✓ | 62.9 | 64.4 | 62.1 |

Here, cKNN: consensus KNN graph;
AP: affinity propagation;
SemiPriori: semi-supervised prior knowledge;
SemiCL: semi-supervised contrastive loss in projected feature space on [CLS] and [P].
Scores reported in clustering accuracy.
Each proposed component favorably contributes to the overall performance.

See Wah et al.

Role of discriminative prompt regularization. Table 4 presents the ablation results for prompt-related components of PromptCAL. The $1^{st}$ and $2^{nd}$ rows denote the GCD baseline and the warmed-up PromptCAL-$1^{st}$. It is noted that visual prompts make no significant difference to the performance. However, it can be argued that it is due to lack of semantic discriminative supervision. Specifically, by observing PromptCAL without semantic discrimination supervision ($3^{rd}$ row) and PromptCAL without sample discrimination supervision ($4^{th}$ row), it can be inferred that both semantic discriminativeness and sample-wise discriminativeness are critical. Generally, lack of semantic discriminativeness will cause severe overfitting on Known classes. Furthermore, semantic prompt tuning is beneficial for discovering novel classes, since PromptCAL surpasses its counterpart without any prompt-related component ($5^{th}$ row) on New by 2.6%. To summarize, semantically-aware DPR plays a positive and auxiliary role in facilitating semantic discriminativeness especially in categorizing novel classes. In fact, it can be concluded from additional ablations that the gains of prompts are more significant on larger datasets.

TABLE 4

Ablation study on effectiveness of prompt-related components on CUB-200 dataset.

| | Prompt | $L_{semi}^{P}$ | $L_{CAL}^{P}$ | CAL stage | All | Known | New |
|---|---|---|---|---|---|---|---|
| (1) | ✗ | ✗ | ✗ | ✗ | $51.3^{-11.6}$ | $56.6^{-7.8}$ | $55.1^{-12.4}$ |
| (2) | ✓ | ✗ | ✗ | ✗ | $61.7^{-11.8}$ | $63.6^{-9.0}$ | $60.7^{-12.2}$ |
| (3) | ✓ | ✓ | ✗ | ✓ | $57.3^{-1.3}$ | $61.8^{+4.5}$ | $55.1^{-4.1}$ |
| (4) | ✓ | ✗ | ✓ | ✓ | $54.6^{-1.7}$ | $65.5^{+0.8}$ | $49.1^{-2.9}$ |
| (5) | ✗ | ✗ | ✗ | ✓ | $62.9^{-2.6}$ | $64.4^{+0.4}$ | $62.1^{-4.1}$ |
| (6) | ✓ | ✓ | ✓ | ✓ | 62.9 | 64.4 | 62.1 |

Here, Prompt: prompt-adapted backbone;
$L_{semi}^{P}$: semi-supervised contrastive loss on [P] prompts;
$L_{CAL}^{P}$: CAL loss on [P];
CAL stage: second-stage training.
Scores reported in clustering accuracy.
Each component favorably contributes to the overall performance gain.

Figure 8A:
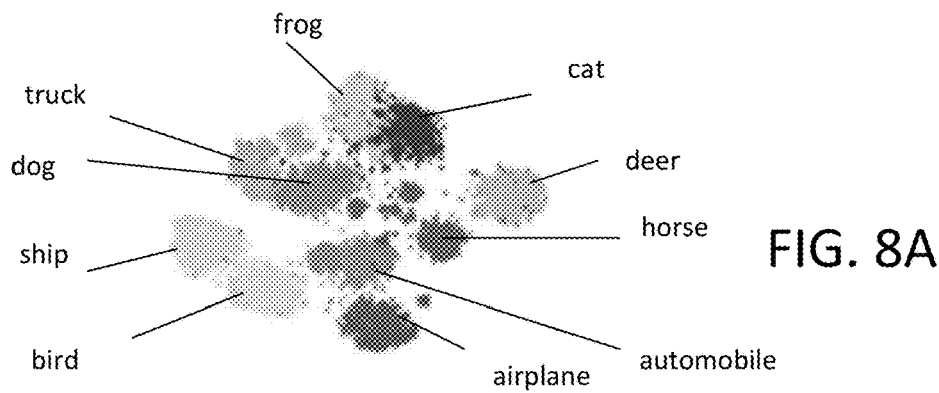
FIGS. 8A-8D illustrate ViT embeddings.
Figure 8B:
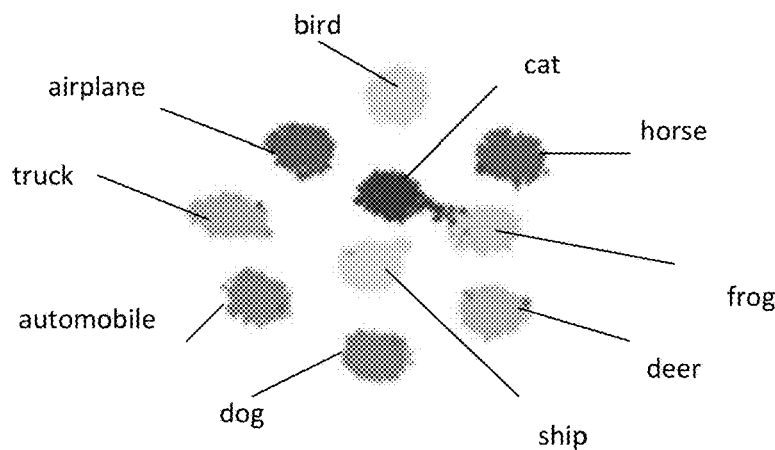
Figure 8C:
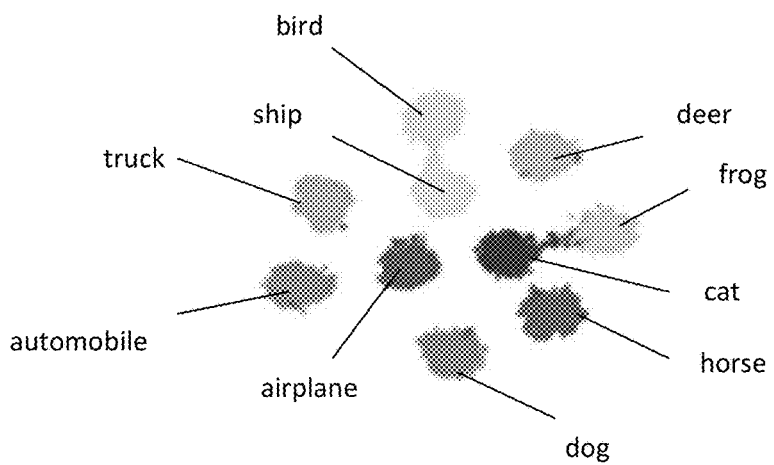
Figure 8D:
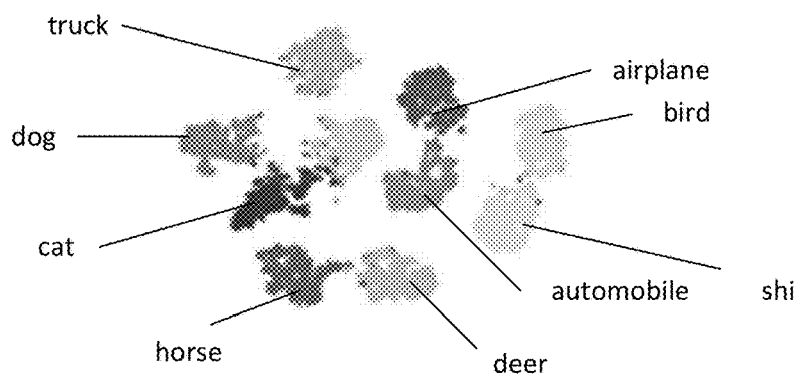

To vividly illustrate this point, the t-SNE visualization results are presented in FIGS. 8A-8D. See Laurens Van der Maaten and Geoffrey Hinton. Visualizing data using t-sne. *Journal of machine learning research*, 9(11), 2008, incorporated herein by reference in its entirety. The figures illustrate the t-SNE visualization of ViT embeddings on CIFAR-10 test set. See Van der Maaten and Hinton. FIG. 8A is [CLS] embeddings from naive VPT model; FIG. 8B denotes the PromptCAL [CLS] embeddings; FIG. 8C denotes the PromptCAL ensembled [P] embeddings; FIG. 8D represents embeddings of an arbitrary PromptCAL unsupervised prompt. All figures share the same axis scale.

Conclusions based on the results in FIGS. 8A-8D include that (a) naive VPT causes overclustering problem and lacks semantically discriminativeness; (b) DPR supervision increases semantic discriminativeness of supervised and unsupervised prompts, which further enhances semantic signals of DPR loss and enables DPR and CAL to synergistically improve the overall performance.

Few-annotation GNCD; a further evaluation the Prompt-CAL against other SOTA methods on more challenging few-annotation setups on CIFAR-100 dataset, i.e., fewer known classes and lower labeling ratios. Consider three setups in Table 5: (1) C50-L10: 50% classes are known in which 10% samples are labeled; (2) C25-L50: 25% classes are known in which 50% samples are labeled; (3) C10-L50: 10% classes are known in which 50% samples are labeled. Since the few-annotation can incur more open-set noises, set K=5 for PromptCAL to increase robustness to noisy pseudo-labels.

TABLE 5

Ablation study on few-annotation GNCD on CIFAR-100 dataset. Digits following 'C' and 'L' stand for percentages of known classes and labeling ratios.

| | C50-L10 | | | C25-L50 | | | C10-L50 | | |
|---|---|---|---|---|---|---|---|---|---|
| Method | All | Known | New | All | Known | New | All | Known | New |
| GCD | 60.2 | 68.9 | 55.8 | 56.8 | 67.6 | 55.0 | 48.3 | 65.1 | 47.3 |
| ORCA (ResNet) | 39.4 | 55.1 | 31.2 | 37.0 | 64.1 | 31.7 | 30.1 | 64.3 | 27.1 |
| ORCA† (ViT) | 60.3 | 66.0 | 55.3 | 58.2 | 79.9 | 57.5 | 51.7 | 78.0 | 50.2 |
| PromptCal-$1^{st}$ (Ours) | 62.7 | 74.7 | 56.6 | 60.2 | 70.7 | 58.5 | 48.7 | 68.4 | 47.6 |
| PromptCal-$2^{nd}$ (Ours) | 68.9 | 77.5 | 64.7 | 65.7 | 76.9 | 63.8 | 53.2 | 79.3 | 51.7 |

†denotes adapted methods.
Scores reported in accuracy.

Vaze et al., Cao et al.

From results in Table 5, it can be concluded that PromptCAL is robust to both low-labeling and few-class scenarios, outcompeting all SoTAs with large margins. Practically, it is more demanding for models to infer novel semantic clustering when fewer classes are known under semantic shifts. This explains the lower performance of all models in setup (3) than in setup (1). Compared with GCD and ORCA, PromptCAL can learn semantically robust representation and consistently achieve high performance in all setups. ORCA (VIT) achieves stronger performance than GCD; while, PromptCAL can still outperform ORCA with clear margins in all setups. For example, PromptCAL surpasses ORCA (ViT) by ~8% on All accuracy in C50-L10 and C25-L50. It can be observed that PromptCAL-$2^{nd}$ learning contributes most to the overall performance, which again proves the method can effectively calibrate the learned representation with remarkable gains on New classes. This capability best suits GNCD problem.

Additional Details on SemiAG

In this section, an extended description of TPG affinity propagation algorithm is presented that underlies the SemiAG method.

Suppose a graph G=(V, E) with a node set V and an edge set E. In the context, V is a set of N embeddings and $E \in R^{N \times N}$ represents the pairwise affinity matrix. TPG runs a graph diffusion process on a tensor product graph $\mathcal{G} = (V \times V \mathcal{E})$ defined on $\mathcal{G}$, where $\mathcal{E} = E \otimes E$ represents a 4-dim tensor. In particular, for i,j,k,l=1 . . . , N, the tensor element $\mathcal{E}_{i,j,k,l} = E_{i,j} E_{k,l} \in R^{NN \times NN}$. In other words, the tensor graph $\mathcal{G}$ can be intuitively considered as a higher-order graph through cartesian product between $\mathcal{G}$ and itself. Then the graph diffusion process on $\mathcal{G}$ is formulated as:

$$\mathcal{E}^{(t)} = \sum_{i=0}^{t} \mathcal{E}^i$$

where $\mathcal{E}^{(t)}$ denotes the t-th step affinity matrix and $\mathcal{E}^i$ is i-power of $\mathcal{E}$. Theoretically, if the row-sum of $\mathcal{E}$ is less than one, $\mathcal{E}^{(t)}$ will converge to a nontrivial solution. To make computation tractable on large-scale data, TPG proposes an iterative equation without multiplication on tensors which theoretically guarantees the same converged solution, which is formulated as:

$$Q^{(t+1)} = EQ^{(t)}E^T + I$$

where I denotes an identity matrix, E is the affinity matrix, and $Q^{(0)} = E$.

In the present disclosure, the method calibrates the affinity graph with only first-order structural information and, thus, set the diffusion step $\eta=1$ since: firstly, online diffusion till convergence at each iteration will incur great computation overheads; besides, larger diffusion steps will include noisy false positives which significantly degrades the overall performance. Based on the further observation that the row-wise sum constraint has negligible effect on final performance, the method excludes the row-wise sum threshold in TPG as another hyperparameter.

Dataset Details

The PromptCAL is evaluated on six benchmarks, i.e., CIFAR-10, CIFAR-100, ImageNet-100, CUB-200, StandfordCars, and Aircraft. The profile of six benchmark datasets is displayed in Table 6. The dataset splits follow GCD.

TABLE 6

The dataset profiles of six benchmarks for evaluation.

| Dataset | CIFAR-10 | CIFAR-100 | ImageNet-100 | CUB-200 | Aircraft | StanfordCars |
|---|---|---|---|---|---|---|
| #Images in $\mathcal{D}$ | 50k | 50k | 127.2k | 6k | 6.6k | 8.1k |
| #Classes ($|\mathcal{C}|$) | 10 | 100 | 100 | 200 | 100 | 196 |
| #Known Classes ($|\mathcal{C}_{kwn}|$) | 5 | 80 | 50 | 100 | 50 | 98 |

Further Implementation Details

Architecture and optimization; the method uses a 12-layer base vision transformer with a patch size of 16 (ViT-B/16) as the backbone in all experiments. The backbone weights are initialized with pre-trained DINO on the ImageNet-1K dataset. The first 11 blocks of the backbone are frozen. For the PromptCAL, further adapt pre-trained ViT with prompts by prepending 5 prompts before each block (in VPT-Deep scheme). See Sharir et al. and Menglin Jia et al. Only supervise the first 2 of 5 prompts at the last block with DPR loss, and all remaining prompts are unsupervised and thus automatically learned. In practice, this ViT backbone can be of any architecture and pretrained with any self-supervised learning method on largescale datasets. Initially, separately adopt two DINO projection heads for [CLS] and [P] to avoid negative interferences, which are randomly initialized. In both stages, the batch size is fixed to 128 on all datasets; besides, PromptCAL is optimized with standard SGD with a momentum of 0.9, a weight decay of $5 \times 10^{-5}$, and an initial learning rate of 0.1. For all datasets, PromptCAL is trained with 200 epochs in the first stage; in the second stage, train PromptCAL with 70 epochs on CIFAR-10/100 and ImageNet-100 datasetes; while, optimizing PromptCAL by 100 epochs on CUB-200, StanfordCars, and Aircraft datasets.

Warmup training includes, in the $1^{st}$ stage training of PromptCAL, adopt an unsupervised $L_2$ distillation loss on ImageNet-1K with a loss weight of min $$\left(0, 0.5 \times \left(1 - \frac{E}{5}\right)\right).$$

See Krizhevsky et al. (2017). Here, E denotes the epoch number. This loss is added based on consideration of potential adverse effects of randomly initialized visual prompts on the class token.

Contrastive affinity learning. In the $2^{nd}$ stage training of PromptCAL, model parameters (prompt-adapted backbone with two heads) are initialized by the best warmed-up checkpoint at the $1^{st}$ stage. For SemiAG parameters, fix the neighborhood size $K = |\mathcal{M}|/(4|\mathcal{C}|)$ for all datasets unless otherwise specified. Fix sizes of both memories as $|\mathcal{M}|=|\mathcal{M}_p|=4096$ and set $N_{neg}=1024$ in all experiments. Furthermore, since most edges of the binarized affinity graph $G'_b$ are of small values, first compute the mean value of non-zero affinities; then, fix threshold q to 80% quantile of affinities above this value for all fine-grained datasets, and 50% for all generic datasets. Fix diffusion step $\eta=1$. For loss parameters, fix a=0.35, $\tau=1.0$, and $\tau_a=0.07$ based on existing literature. Besides, determine $\gamma=0.35$ and $\beta=0.6$ via first and second stage validation scores on the held-out validation set. The teacher model is initialized by the student weights at the beginning, and conduct momentum updates with a momentum of 0.999 at each iteration. During the inference, the [CLS] representation of the student model is used for prediction.

A validation scheme, following GCD setup, assumes access to a small validation set, in which only samples from known classes are labeled. In the first stage, keep the best checkpoint with the highest clustering accuracy on Known on the validation set. In the second stage, keep the best checkpoint with the highest clustering quality on the validation set for evaluation. Clustering quality is defined as the average score of the clustering accuracy on Known classes and unsupervised Silhouette score on New. See Peter J Rousseeuw. Silhouettes: a graphical aid to the interpretation and validation of cluster analysis. *Journal of computational and applied mathematics*, 20:53-65, 1987, incorporated herein by reference in its entirety. Note that there is no information leakage, since Silhouette score does not need ground-truth label.

For GCD, since the dataset splits are consistent with theirs, report their official scores for main comparisons. In ablations, its results are reproduced based on their official codes. For ORCA, adapt their backbone from ResNet to the same pre-trained DINO and obtain results based on their official codes. See Cao et al. (2021). For the baseline (PromptCAL w/o prompt), remove all the prompts and DPR loss on them; besides, keep the warmup training stage for fair comparison. Other parameters follow the standard setups.

Additional Experiment Results
Inductive Category Discovery

In contrast to the evaluation protocol on transductive category discovery GCD, we also conduct ablation experiments on inductive category discovery protocol proposed in ORCA. In other words, besides achieving high performance on category discovery on the unlabeled training data (transductive protocol), it is expected that models will learn general rules applied to unseen test sets (inductive protocol). Therefore, conduct experiment under this inductive evaluation protocol on three benchmarks (CUB-200, CIFAR-100, and ImageNet-100 datasets). In this experiment, hold out 10% (labeled and unlabeled) training data as the validation set for GCD and PromptCAL. From displayed results in Table 7, it can be concluded that the PromptCAL achieves the best performance on three datasets, which manifests its good generalization capability. Meanwhile, it can be observed that PromptCAL boosts performance on New with significant margins.

TABLE 7

Evaluation in the inductive GCD setting on three benchmarks.

| Method | CUB-200 | | | | |
|---|---|---|---|---|---|
| | All | Known | New | Known* | New* |
| GCD | 57.5 | 64.5 | 50.6 | 69.2 | 57.6 |
| ORCA (DINO) | 40.7 | 61.2 | 20.2 | 76.3 | 38.3 |
| PromptCAL(our) | 62.4 | 68.1 | 56.8 | 70.1 | 60.1 |

| Method | CIFAR-100 | | | | | ImageNet-100 | | | | |
|---|---|---|---|---|---|---|---|---|---|---|
| | All | Known | New | Known* | New* | All | Known | New | Known* | New* |
| GCD | 70.1 | 76.8 | 43.5 | 78.7 | 58.2 | 79.7 | 92.7 | 66.7 | 92.7 | 66.9 |
| ORCA (DINO) | 77.7 | 83.6 | 53.9 | 83.6 | 66.6 | 81.3 | 94.5 | 68.0 | 94.5 | 71.1 |
| PromptCAL(our) | 81.6 | 85.3 | 66.9 | 86.2 | 71.3 | 84.8 | 94.4 | 75.2 | 94.4 | 75.3 |

The results are reported in accuracy scores on the test set.
Here, the task-informed evaluation protocol in Cao et al. and Fini et al. is adopted, i.e.,
Known* and New* are evaluated by separate clustering and Hungarian assignment.

Additional Ablation on SemiAG and DPR

To further validate the effectiveness of the SemiAG, ablation is conducted on different positive mining methods integrated into the online contrastive learning framework with CAL. Besides, more ablation results are supplemented on larger datasets (i.e., CIFAR-100 and ImageNet-100 datasets) to showcase that learning with semantically discriminative prompts can achieve notable improvements across various datasets. The experiment results are presented in Table 8. Firstly, it can be seen that SemiAG significantly outperforms other positive mining methods, i.e., naive KNN with SemiPriori (KNN w/S.P.) and Ranking Statistics (R.S.). The results unveil that both KNN with SemiPriori and RankingStats fail to reliably uncover the substantial semantic information in embedding spaces, which proves that the SemiAG method is the most effective in this open-set setting. On the other hand, removing either DPR loss or entire prompt-related components in Prompt-CAL causes noticeable performance drop, e.g., nearly 3% and 2% drops on All on CIFAR-100 dataset after removing prompts and DPR loss. Moreover, removing either component also leads to severe overfitting on Known classes.

TABLE 8

Further ablation study on
CUB-200, CIFAR-100, and ImageNet-100 datasets.

| Dataset | Setup | All | Known | New |
|---|---|---|---|---|
| CUB-200 | w/o prompt | 60.3 | 64.8 | 58.0 |
| CUB-200 | w/o DPR | 59.3 | 63.3 | 57.4 |
| CUB-200 | KNN w/S.P. | 60.1 | 70.1 | 55.1 |
| CUB-200 | R.S. | 55.6 | 66.0 | 50.3 |
| CUB-200 | PromptCAL | 62.9 | 64.4 | 62.1 |

TABLE 8-continued

Further ablation study on
CUB-200, CIFAR-100, and ImageNet-100 datasets.

| Dataset | Setup | All | Known | New |
|---|---|---|---|---|
| CIFAR-100 | w/o prompt | 78.1 | 83.0 | 68.4 |
| CIFAR-100 | w/o DPR | 79.0 | 83.4 | 70.3 |
| CIFAR-100 | KNN w/S.P. | 78.7 | 85.3 | 65.4 |
| CIFAR-100 | R.S. | 75.9 | 87.1 | 53.4 |
| CIFAR-100 | PromptCAL | 81.2 | 84.2 | 75.3 |
| ImageNet-100 | w/o prompt | 81.8 | 94.7 | 75.3 |
| ImageNet-100 | w/o DPR | 80.7 | 94.8 | 73.6 |
| ImageNet-100 | KNN w/S.P. | 81.9 | 95.0 | 75.3 |
| ImageNet-100 | R.S. | 78.1 | 95.2 | 69.4 |
| ImageNet-100 | PromptCAL | 83.1 | 92.7 | 78.3 |

Four setups are investigated: the first is PromptCAL removing all prompt related components; the second is PromptCAL without DPR loss; the third is replacing SemiAG with naive KNN incorporated with SemiPriori; the last one is replacing the SemiAG with RankingStats pseudo labeling.

Visualization on Embeddings

To inspect the learned semantic discriminativeness of PromptCAL, visualize embeddings by t-SNE algorithm in FIG. 7. Firstly, by comparing (a-d), it can be concluded that PromptCAL can effectively learn better semantic clustering, witnessed by higher purity, larger inter-class separation, and high compactness. Notice in (b) that naive VPT model suffer from degraded clustering performance compared with (a) baseline, which again proves that lack of semantic supervision is a critical issue (see ablations in main content) in prompt tuning. Interestingly, though not supervised, automatically learned prompts [P]*in (i) and (j) can still learn robust semantically meaningful representation, benefiting from DPR on [P]. Meanwhile, DPR loss reinforce this effect in (g) and (h). Furthermore, it can also be observed that [P] supervised by CAL loss (h) can learn better semantic clustering than those supervised by SemiCL (g), and better benefit [P]*(j). Thanks to better semantic information supplied by CAL loss, [CLS] of PromptCAL-$2^{nd}$ learns more compact and better-separated clusters compared with that of PromptCAL-$1^{st}$. To summarize the above, it can be concluded that the second stage enhances the prompts potential using CAL loss, which further enables prompts and CAL to synergistically improve the overall performance.

Sensitivity Analysis on Hyperparameters.

Ablation experiments are conducted on critical hyperparameters of PromptCAL, which includes: (1) CAL loss weight $\beta$; (2) neighborhood size K; (3) different pretraining methods; (4) number of auxiliary prompts.

Figure 9A:
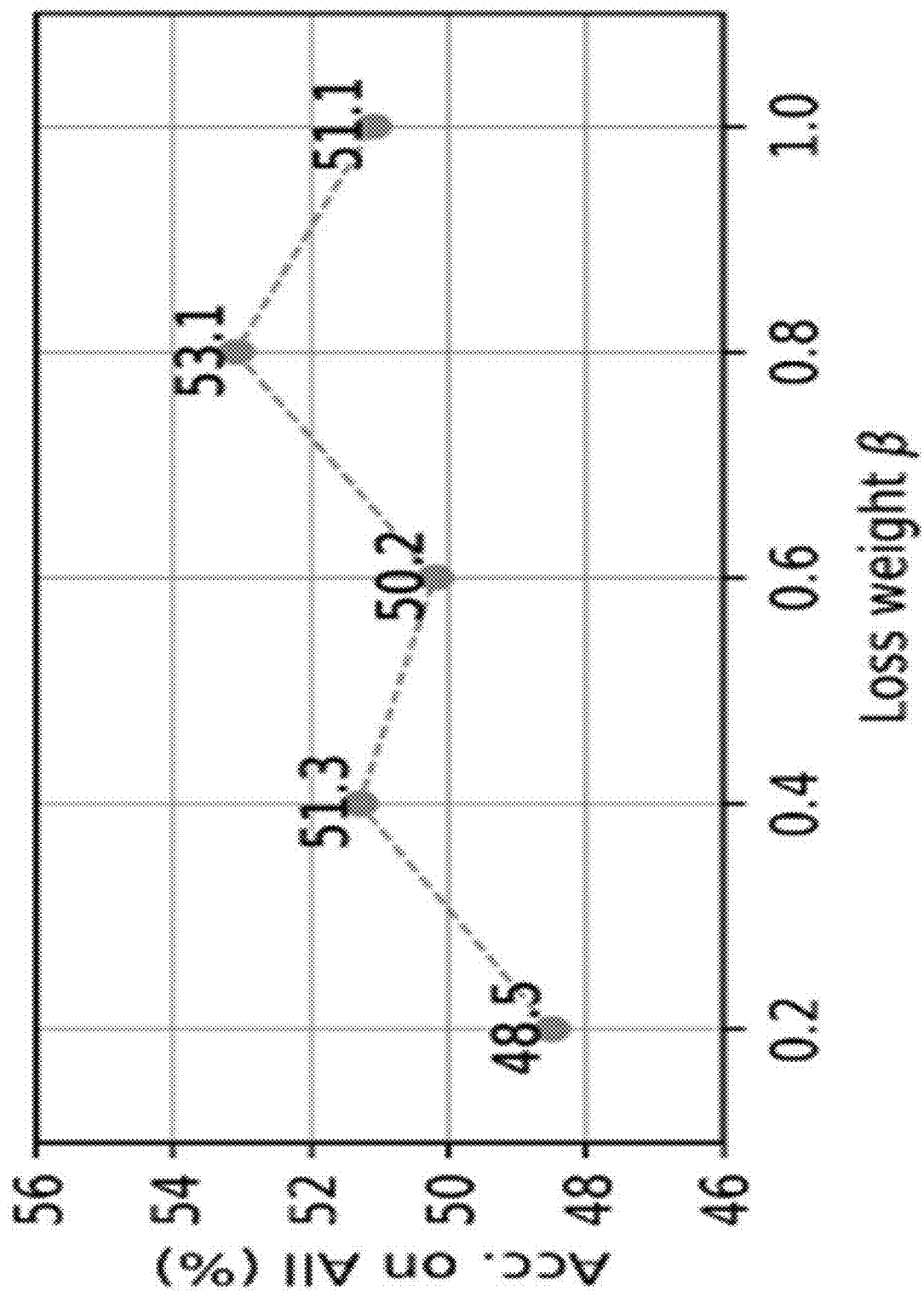
FIGS. 9A, 9B, 9C are graphs for ablation study on the CAL loss weight.
Figure 9B:
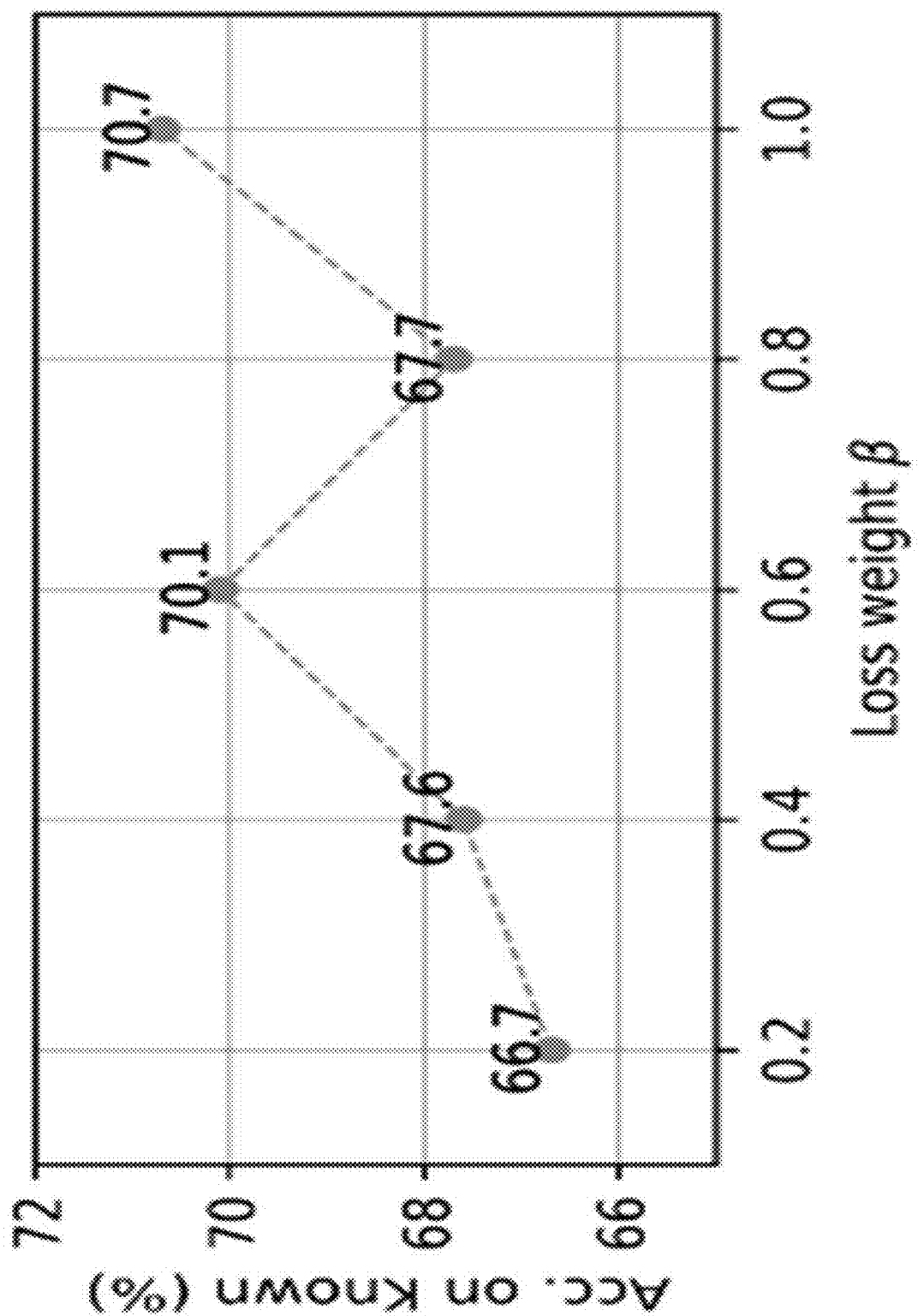
Figure 9C:
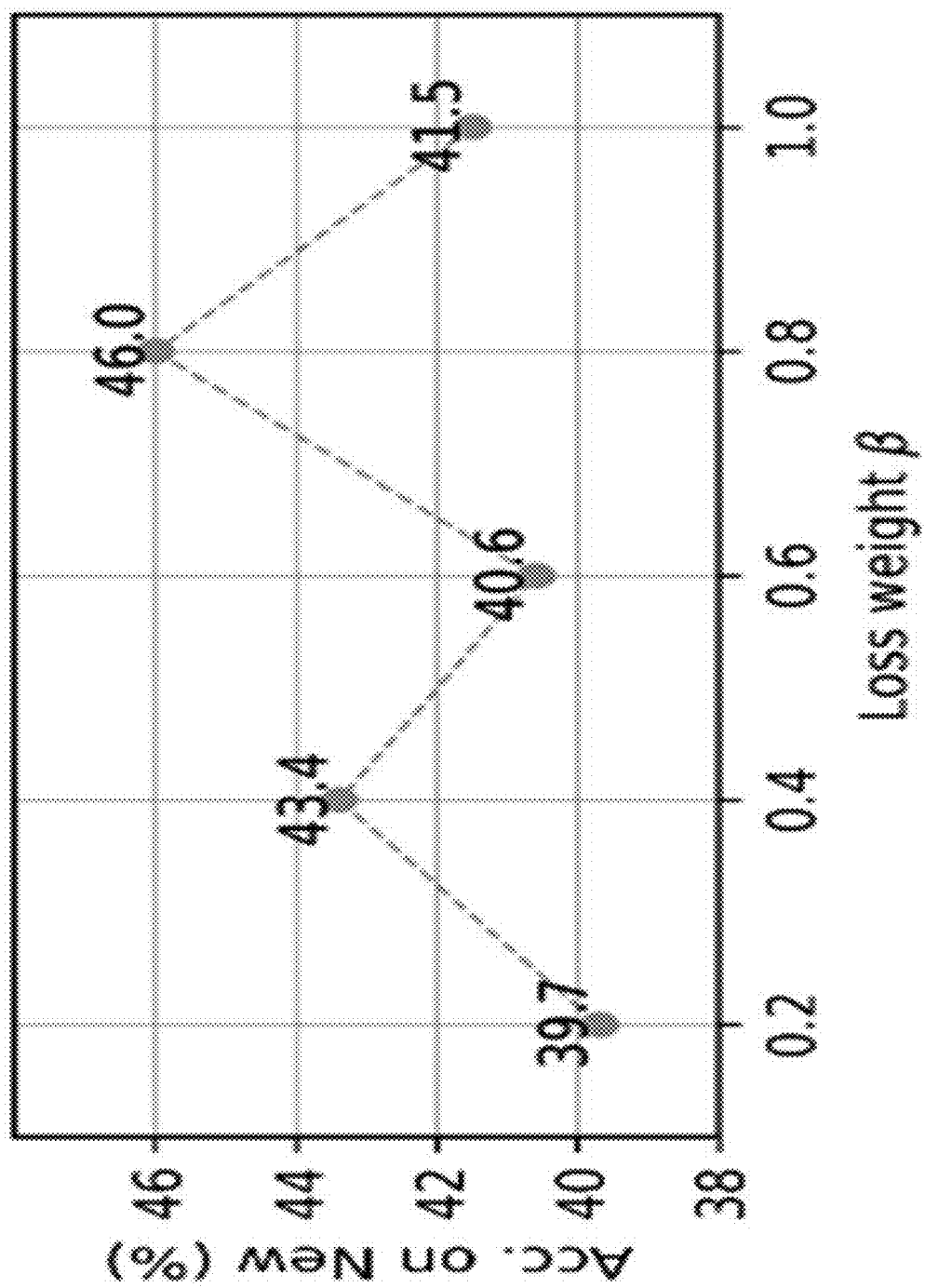

CAL loss weight may include sample values from 0.2 to 1.0 at an interval of 0.2 and run experiments on StanfordCars dataset. The results are visualized in FIG. 9A-9C. FIGS. 9A-9C are graphs illustrating the ablation study on the CAL loss weight on StanfordCars dataset.

It can be observed that decreased weights of contrastive affinity learning will cause model suffer from low performance on New. It can be argued that, although different datasets exhibit different trends, the model performance is fairly robust within the modest value range (from 0.4 to 0.8).

In neighborhood size, select K=5, 10, 15, 20 for ablations on two datasets (CIFAR-100 and Aircraft, both with 100 All classes). Results in Table 9 display that Prompt-CAL is robust to small K; while, its performance degrades largely as the neighborhood expands. It is because false positive has severer negative effects than false negatives.

TABLE 9

Ablation study on the neighborhood
size K on the CIFAR-100 and Aircraft datasets.

| | CIFAR-100 | | | Aircraft | | |
|---|---|---|---|---|---|---|
| K | All | Known | New | All | Known | New |
| 5 | 80.9 | 85.5 | 71.7 | 49.0 | 54.4 | 46.3 |
| 10 | 81.2 | 84.2 | 75.3 | 52.2 | 52.2 | 52.3 |
| 15 | 80.2 | 83.4 | 74.0 | 50.6 | 55.1 | 48.4 |
| 20 | 78.9 | 80.3 | 76.1 | 47.4 | 52.5 | 45.0 |

See Krizhevsky et al. (2009) and Maji et al.

In pretraining, it can be argued that PromptCAL can take advantage of the property of the high KNN precision of ViT, which are pre-trained in various schemes. In Table 10, DINO pre-trained ViT is replaced with iBOT pre-trained ViT as the backbone in CIFAR-100 experiments. See Jinghao Zhou, Chen Wei, Huiyu Wang, Wei Shen, Cihang Xie, Alan Yuille, and Tao Kong. ibot: Image bert pre-training with online tokenizer. arXiv preprint arXiv: 2111.07832, 2021, each incorporated herein by reference in their entirety. It can be shown that PromptCAL further improves as iBoT possesses higher KNN precision. It manifests that the PromptCAL performance is likely to correlate with better initial representations.

TABLE 10

Ablation study on
pretraining methods on CIFAR-100 dataset.

| Method | All | Known | New |
|---|---|---|---|
| GCD | 73.0 | 76.2 | 66.5 |
| PromptCAL (iBoT) | 83.0 | 85.0 | 78.9 |
| PromptCAL (DINO) | 81.2 | 84.2 | 75.3 |

See Krizhevsky et al. (2009).

The number of supervised prompts by varying the number of supervised prompts to observe sensitivity of performance w.r.t. this parameter. Table 11 showcases the results under different setups. It can be observed that leaving some unsupervised prompt to learn can provide extra flexibility to the backbone and thus achieves the best performance, especially on New. In general, PromptCAL is robust to different numbers of supervised prompts.

TABLE 11

Ablation study on prompt
numbers of the prompt-adapted ViT backbone.

| | Stage 1 | | | Stage 2 | | |
|---|---|---|---|---|---|---|
| Method | All | Known | New | All | Known | New |
| GCD | 51.3 | 56.6 | 48.7 | — | — | — |
| DPR-2-5 | 51.1 | 55.4 | 48.9 | 62.9 | 64.4 | 62.1 |
| DPR-1-5 | 51.7 | 57.2 | 48.9 | 59.9 | 63.0 | 58.4 |
| DPR-5-5 | 50.9 | 55.6 | 48.6 | 61.0 | 63.6 | 59.8 |

Evaluation conducted on CUB-200 dataset.

See Wah et al.

Additional Results on Herbarium Dataset

Evaluation results are presented on the challenging Herbarium 2019 dataset, which consists of 683 classes and 34k images in total. See Kiat Chuan Tan, Yulong Liu, Barbara Ambrose, Melissa Tulig, and Serge Belongie. The herbarium challenge 2019 dataset. arXiv preprint arXiv: 1906.05372, 2019, incorporated herein by reference in its entirety. The dataset split follows. Specifically, labeling ratio is set to 50% and known class number to 341. PromptCAL is compared with other SOTAs on this dataset. Considering larger class numbers, enlarge the memory size to $2 \times 10^4$ and $N_{neg}$=5000, accordingly. Set k=$|\mathcal{M}|/(4|\mathcal{C}|) \approx 7$ in this case. Other parameters follow the setup on fine-grained datasets. Table 12 display the results, which demonstrates the Prompt-CAL also excels at discovering categories on large vocabulary fine-grained datasets, especially on New classes.

TABLE 12

Additional experiments on the Herbarium2019 dataset.

| Method | All | Known | New |
|---|---|---|---|
| KMeans | 12.9 | 12.9 | 12.8 |
| RankStats+ | 27.9 | 55.8 | 12.8 |
| UNO+ | 28.3 | 53.7 | 14.7 |

TABLE 12-continued

Additional experiments on the Herbarium2019 dataset.

| Method | All | Known | New |
|---|---|---|---|
| GCD | 35.4 | 51.0 | 27.0 |
| ORCA | 25.5 | 34.7 | 15.8 |
| PromptCAL (our) | 37.0 | 52.0 | 28.0 |

See Tan et al.

Training Algorithm of PromptCAL

Given a training dataset $\mathcal{D}$, the entire training algorithm of PromptCAL is described in Algo. 1. Before PromptCAL training, adapt the ImageNet pre-trained ViT backbone $f(\cdot|\theta)$ with prompts into $f(\cdot|\theta, \theta_p)$, and randomly initialize two identity heads $g(\cdot|\theta_H)$ and $g_P(\cdot|\theta_{P,H})$ for [CLS] and [P], respectively.

---

Algorithm 1: PromptCAL training algorithm.

Input: Training dataset $\mathcal{D} = \mathcal{D}_u \cup \mathcal{D}_l$, an ImageNet pre-trained ViT backbone $f(\cdot|\theta)$, and a randomly-initialized [CLS] projection head $g(\cdot|\theta_H)$.
Output: Trained prompt-adapted model $f(\cdot|\theta, \theta_p)$.

1. Initialize prompt-adapted backbone with random prompts into $f(\cdot|\theta, \theta_p)$.
2. Randomly initialize prompt projection head $g_p(\cdot|\theta_{P,H})$ from g.
   /* Stage 1: Warm-up Training                                                */
3. for each epoch e = 1 ... $E_1$ do
4.     for each batch (X, Y) $\in \mathcal{D}$ do
5.         Z, $\overline{Z}_P$ = Forward(X, f, g, $g_p$) // forward backbone and heads
6.         Compute overall SemiCL loss $L_1$ by Eq. (2) on Z, $\overline{Z}_P$.
7.         Back-propagation and optimize $\theta$, $\theta_p$, $\theta_H$, $\theta_{P,H}$.
   /* Stage 2: Contrastive Affinity Learning                                    */
8. Initialize memory $\mathcal{M}$, $\mathcal{M}_p$.
9. Initialize teacher $f_T$, $g_T$, $g_{P,T}$ from the student model.
10. for each epoch e = 1 ... $E_2$ do
11.     for each batch (X, Y) $\in \mathcal{D}$ do
    /* Forward                                                                 */
12.         H, $\overline{H}_P$, Z, $\overline{Z}_p$ = Forward(X, f, g, $g_p$) // forward student
13.         $H_T$, $\overline{H}_{P,T}$, $Z_T$, $\overline{Z}_{P,T}$ = Forward(X, $f_T$, $g_T$, $g_{P,T}$) // forward teacher
    /* SemiAG for [CLS]                                                        */
14.         Concatenate embedding E ← [$H_T$; $\mathcal{M}$] for [CLS] token and construct sub-graph $G'_b$.
15.         Compute binarized affinity graph $G'_b$ from $G'_H$ by applying SemiAG in Eq. (4) (5) (6) sequentially.
16.         Obtain pseudo positives $\mathcal{P}_a$ and pseudo anchors $\mathcal{A}_a$ from $G'_b$.
17.         Compute CAL loss $L_{CAL}^{CLS}$ for [CLS] with $\mathcal{P}_a$ and $\mathcal{A}_a$ on H by Eq. (7).
    /* SemiAG for [P], similar process to [CLS]                                */
18.         Concatenate embedding $E_P$ ← [$\overline{H}_P$, T; $\mathcal{M}_P$] for [P] token and construct sub-graph $G'_{P,H}$.
19.         Compute $G'_{P,b}$ from $G'_{P,H}$ by applying Eq. (4) (5) (6) sequentially,
20.         Obtain pseudo labels $\mathcal{P}_{P,a}$ and $\mathcal{A}_{P,a}$ from $G'_{P,b}$.
21.         Compute CAL loss $L_{CAL}^P$ for [P] with $\mathcal{P}_{P,a}$ and $\mathcal{A}_{P,a}$ on $\overline{H}_{P,T}$ by Eq. (7).
    /* SemiCL loss                                                             */
22.         Compute $L_{sup}^{CLS}$, $L_{self}^{CLS}$ for [CLS] and $L_{sup}^P$, $L_{self}^P$, for [P] on Z and $Z_T$ by Eq. (8).
    /* Compute total loss                                                      */
23.         Compute [CLS] total loss $L_2^{CLS}$ with $L_{sup}^{CLS}$, $L_{self}^{CLS}$, $L_{CAL}^{CLS}$ by Eq. (9).
24.         Compute overall total loss $L_2$ with $L_2^{CLS}$ and its DPR counterpart $L_2^P$ by Eq. (10).
    /* Back propagation                                                        */
25.         Back-propagation and optimize student $\theta$, $\theta_p$, $\theta_H$, $\theta_{P,H}$.
26.         $\mathcal{M}$ ← Enqueue($\mathcal{M}$, $H_T$), $\mathcal{M}_P$ ← Enqueue($\mathcal{M}_P$, $\overline{H}_{P,T}$) // update memories
27.         Update momentum teacher with current student.
28. return $f(\cdot|\theta, \theta_P)$ In the $1^{st}$ stage, a batch of images X is sampled with their corresponding labels Y at each iteration. Note that ground-truth labels of unlabeled images are masked in Y. Obtain [CLS] and [P] projected features (Z, $Z_P$) by forwarding X through backbone and two heads. Next, compute SemiCL loss (Eq. 2) on the features based on the class labels and label-or-not information in Y. All tunable parameters ($\theta$, $\theta_P$, $\theta_H$, $\theta_{P,H}$) are updated.

Before the $2^{nd}$ stage training, initialize two empty embedding memory bank $\mathcal{M}$, $\mathcal{M}_P$ for [CLS] and [P], respectively. Besides, initialize the teacher model with the student weights. During the training, for each sampled batch (X, Y), first obtain student embeddings of [CLS] and ensembled [P] (H, $\overline{H}_P$), and corresponding student features (Z, $\overline{Z}_P$) by forwarding images to the student. Meanwhile, acquire the teacher embeddings and features ($H_T$, $\overline{H}_{P,T}$, $Z_T$, $\overline{Z}_{P,T}$) from the teacher, correspondingly.

Further, construct a sub-graph for a token (line 14 for the class token and line 18 for ensembled prompts) based on its teacher embeddings of the current batch and all embeddings in its corresponding memory. Given the sub-graph, equentially perform three operations of SemiAG to obtain the calibrated binarized affinity graph (line 15 and 19). For each student embedding, utilize its teacher embedding counterpart as a query on the affinity graph to acquire its pseudo positive set and pseudo anchor set with randomly sampled pseudo negatives (line 16 and 20). With these pseudo positive and anchor sets, compute CAL loss on embeddings of each token (line 17 and 21) by Eq. 7.

Along with CAL loss, also compute SemiCL loss on the projected features; here, student embeddings are utilized as queries and teacher embeddings as keys in the contrastive loss (Eq. 8 and Eq. 9). In other words, for each student embedding, construct its positive and anchor sets with teacher embeddings and then compute the semisupervised contrastive loss. Next, obtain the total loss for the [CLS] token by combining its SemiCL and CAL loss functions (Eq. 9). After adding the DPR counterpart loss on ensembled prompts, finally get the total loss at this stage (Eq. 10).

At each iteration, all tunable parameters of the student are updated. Lastly, update two memories with teacher embeddings of their corresponding token and update momentum teacher model with the updated student model. Note that for inference, embeddings are adopted from the [CLS] token of the student model f($\cdot|\theta$, $\theta_p$) for final predictions.

In this section, qualitative results are presented of categorization confusion matrix, attention map visualization, and KNN retrieval.

Figure 10A:
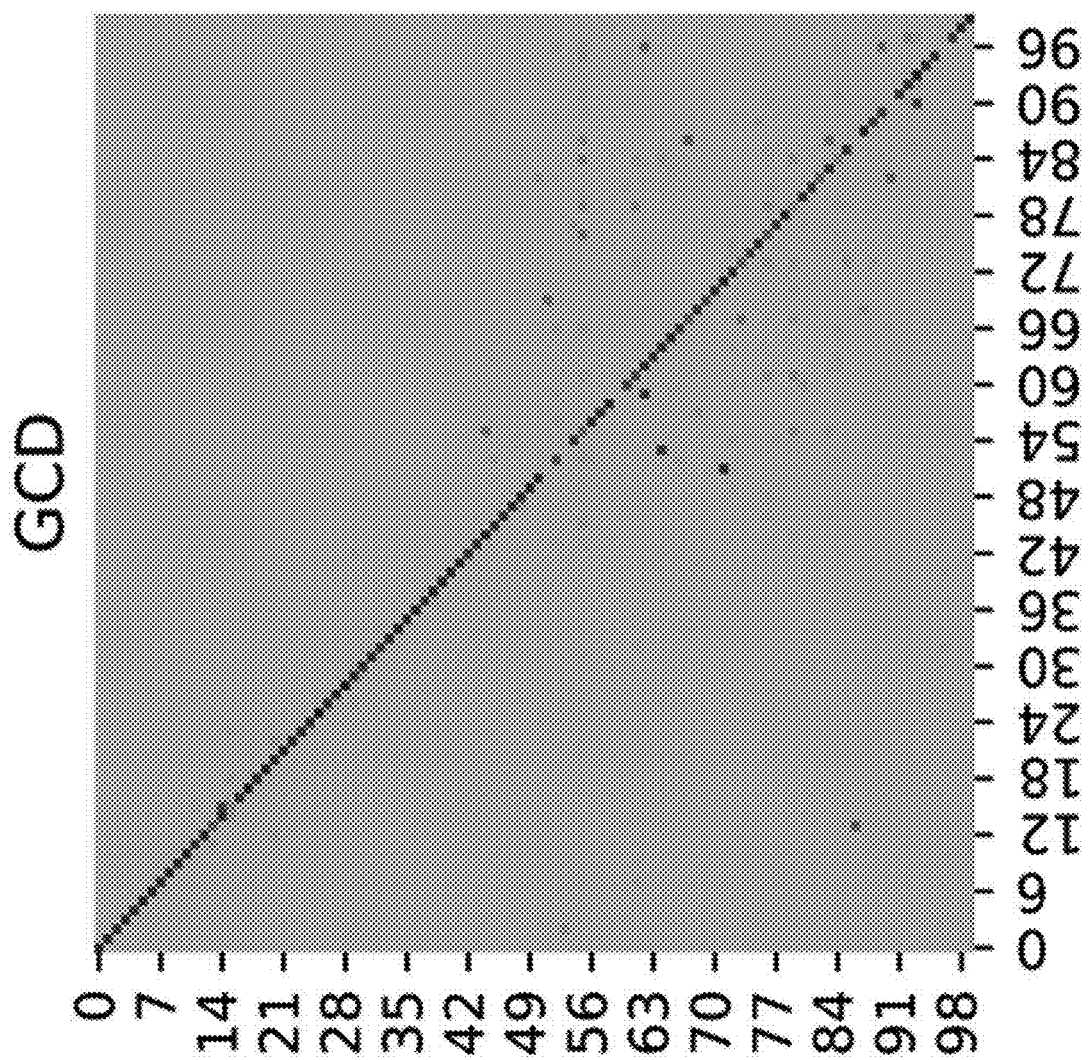
FIGS. 10A and 10B are plots of a confusion matrix of PromptCAL.
Figure 10B:
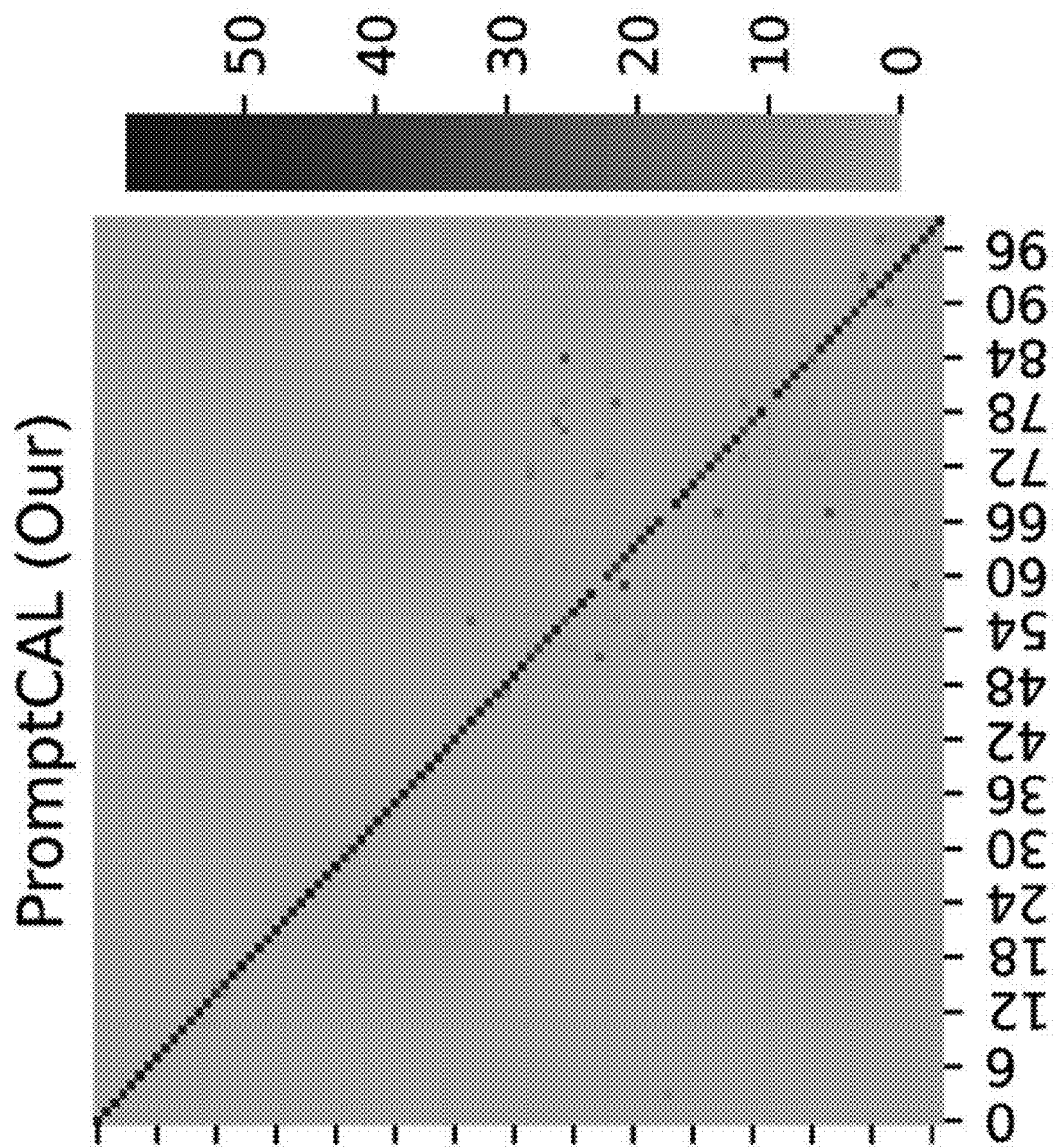

A confusion matrix for GCD is presented and the Prompt-CAL on both Known and New classes on ImageNet-1K dataset in FIGS. 10A and 10B. FIGS. 10A-10B illustrate the confusion matrix of PromptCAL on ImageNet-100 test set. The labels on the x-axis and y-axis denotes the class index of the generated split. The first 50 classes are Known, and the last 50 classes are New.

It can be observed that the PromptCAL can learn more robust clusters on New classes, while preserving high accuracy on Known. Moreover, the PromptCAL is less susceptible to confusion between Known and New.

Figure 11A:
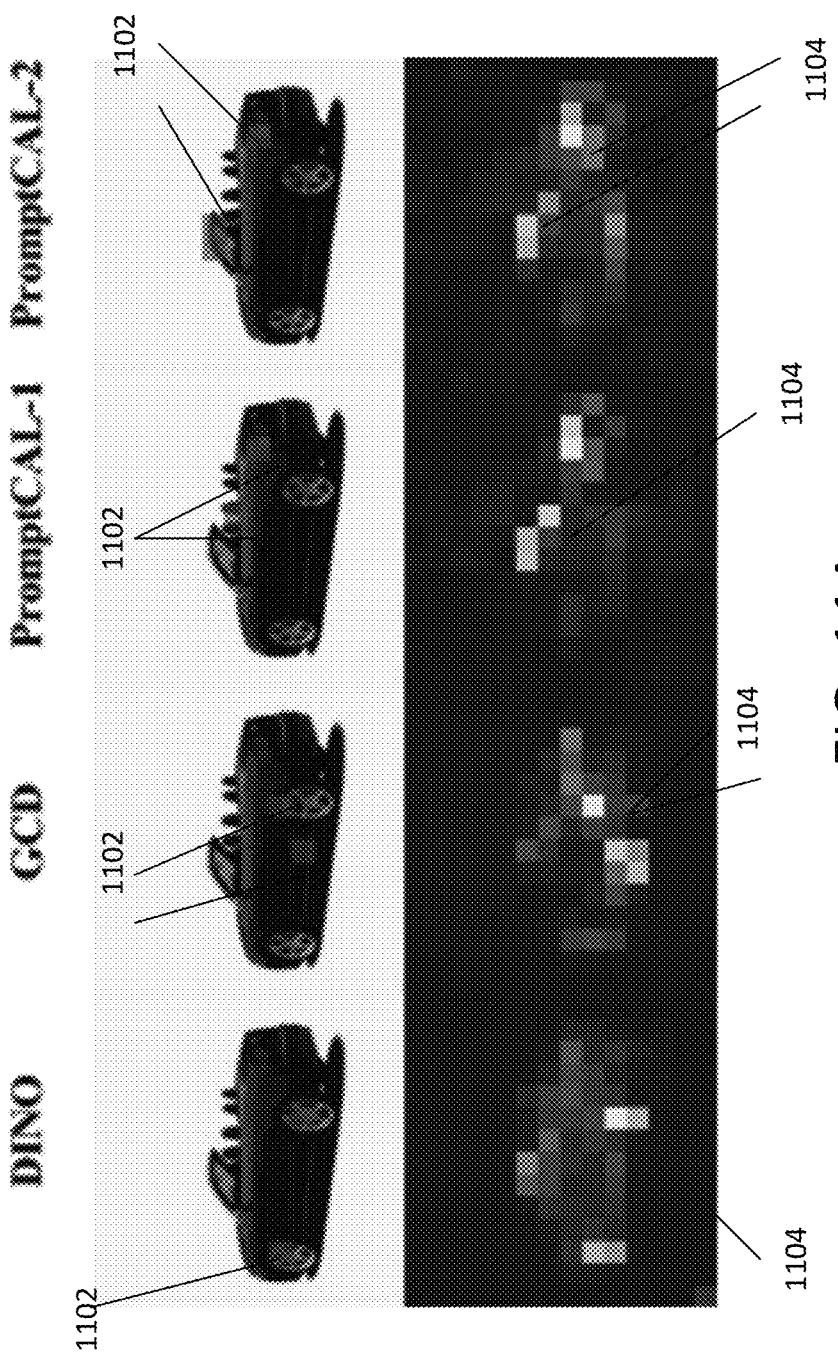
FIGS. 11A-11C illustrate attention map of class tokens for known images.
Figure 11B:
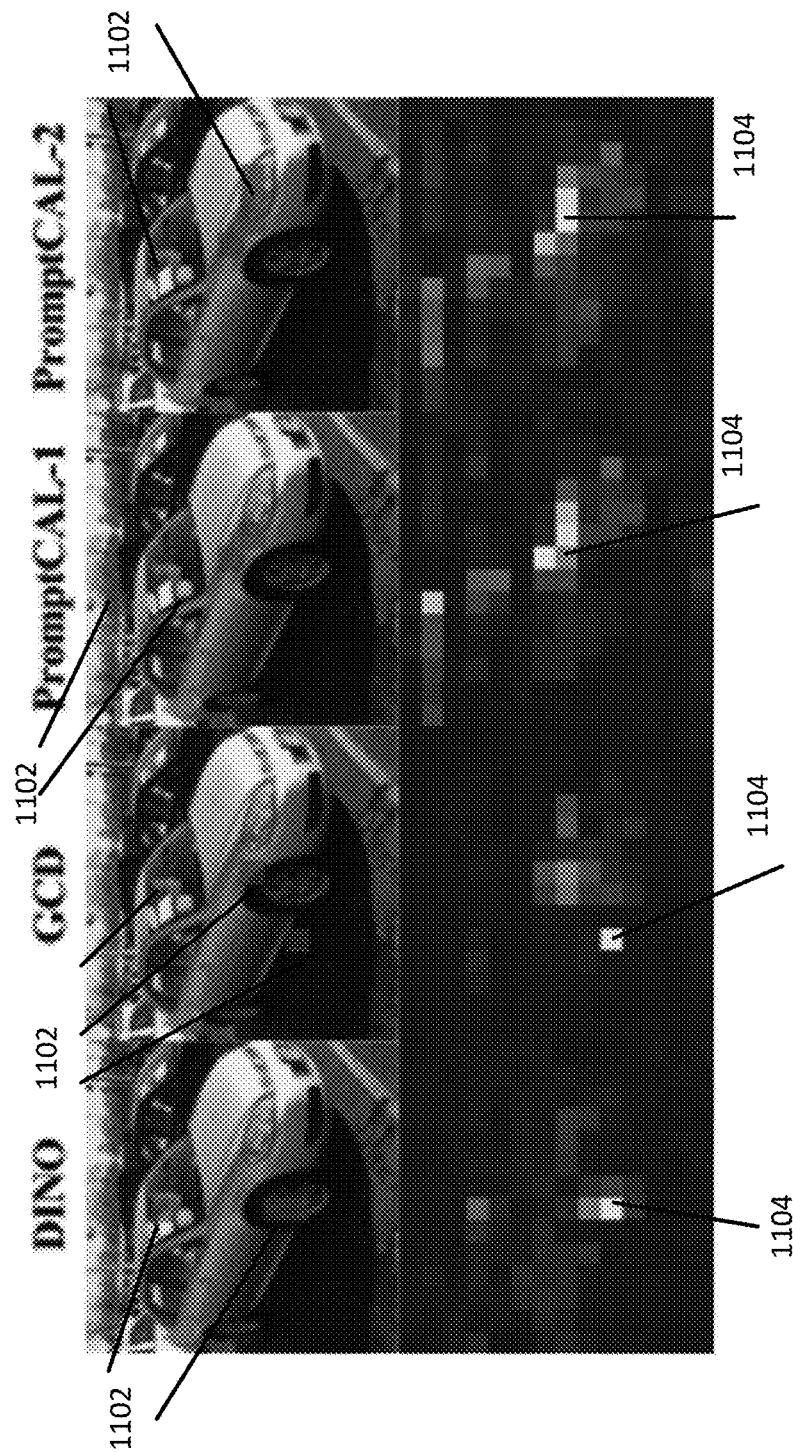
Figure 11C:
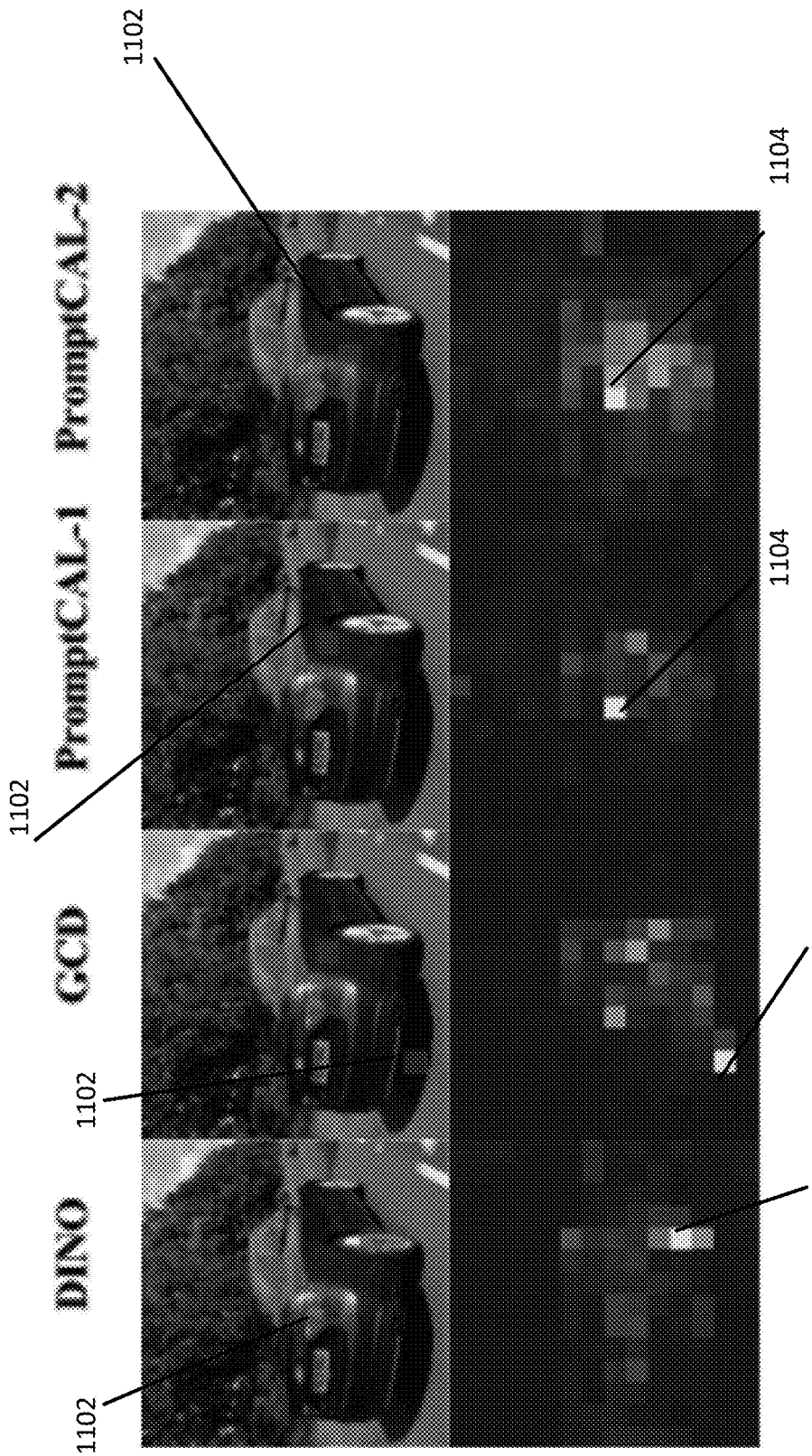

Visualize and compare the attention maps of [CLS] tokens of DINO, GCD, PromptCAL-$1^{st}$, and PromptCAL-$2^{nd}$ in FIGS. 11A and 11B. FIGS. 11A-11B illustrate the attention map visualization of class tokens for comparison on StandfordCars (left) and CUB-200 (right) datasets. The columns from left to right refer to attention maps of DINO, GCD, the first stage PromptCAL, and the second stage Prompt-CAL.

In the first row, attended areas are 1102 in each images; the second row display the complete attention maps corresponding to the first row images (regions 1104 denote high attention values).

The following observations are summarized: (1) DINO attends to the instance discriminative regions, e.g., license plate, and may overfit on surrounding objects; while, PromptCAL lays more attention on class-specific features, e.g., car lights for cars, and feather textures for birds. (2) Although both GCD and PromptCAL can attend to semantically meaningful regions, PromptCAL-$2^{nd}$ focuses on multiple semantically discriminative regions, e.g., car lights and textures, feathers and wings. (3) After CAL training, attention maps of PromptCAL-$2^{nd}$ in contrast to that of PromptCAL-$1^{st}$ are remarkably refined.

Figure 12A:
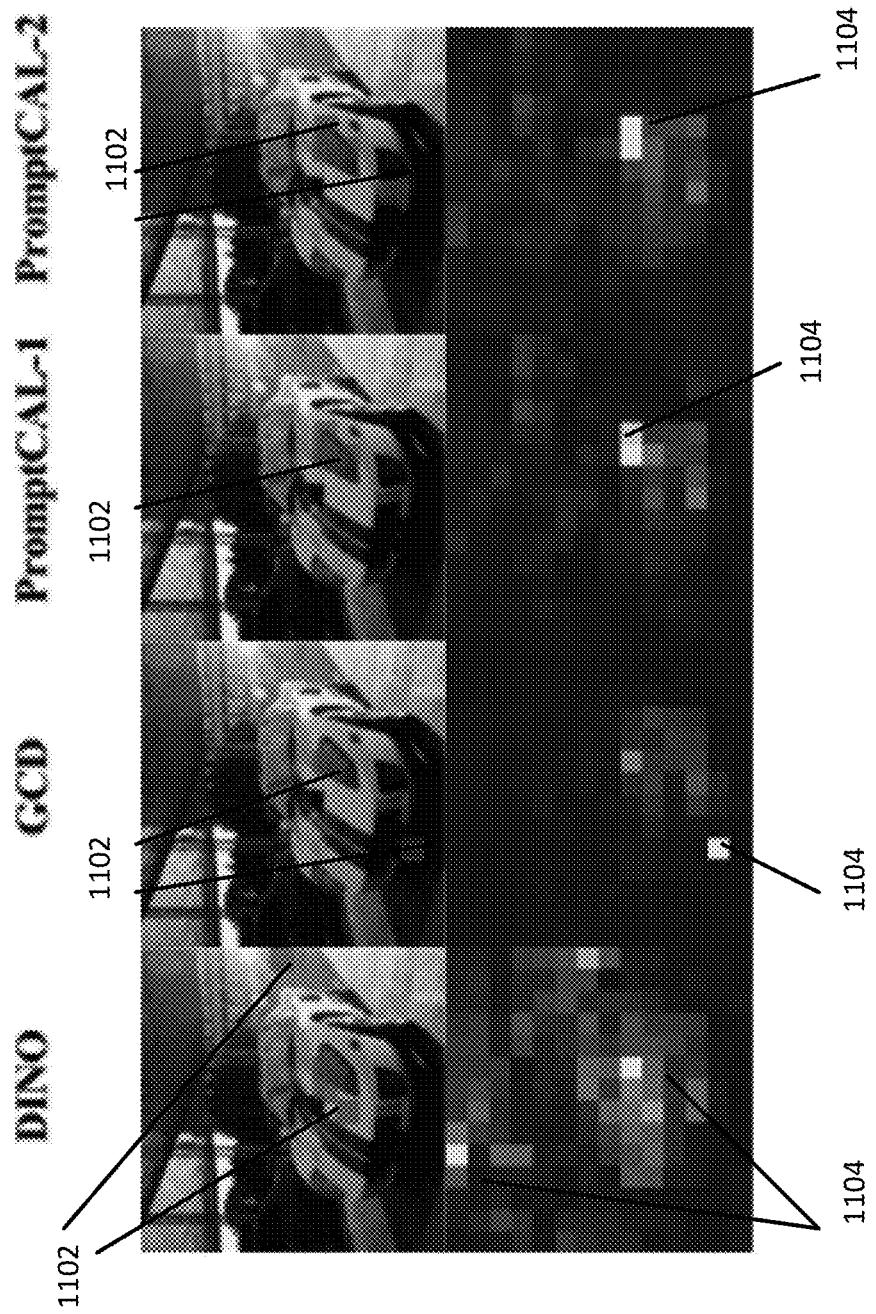
FIGS. 12A-12C illustrate attention map of class tokens for novel images.
Figure 12B:
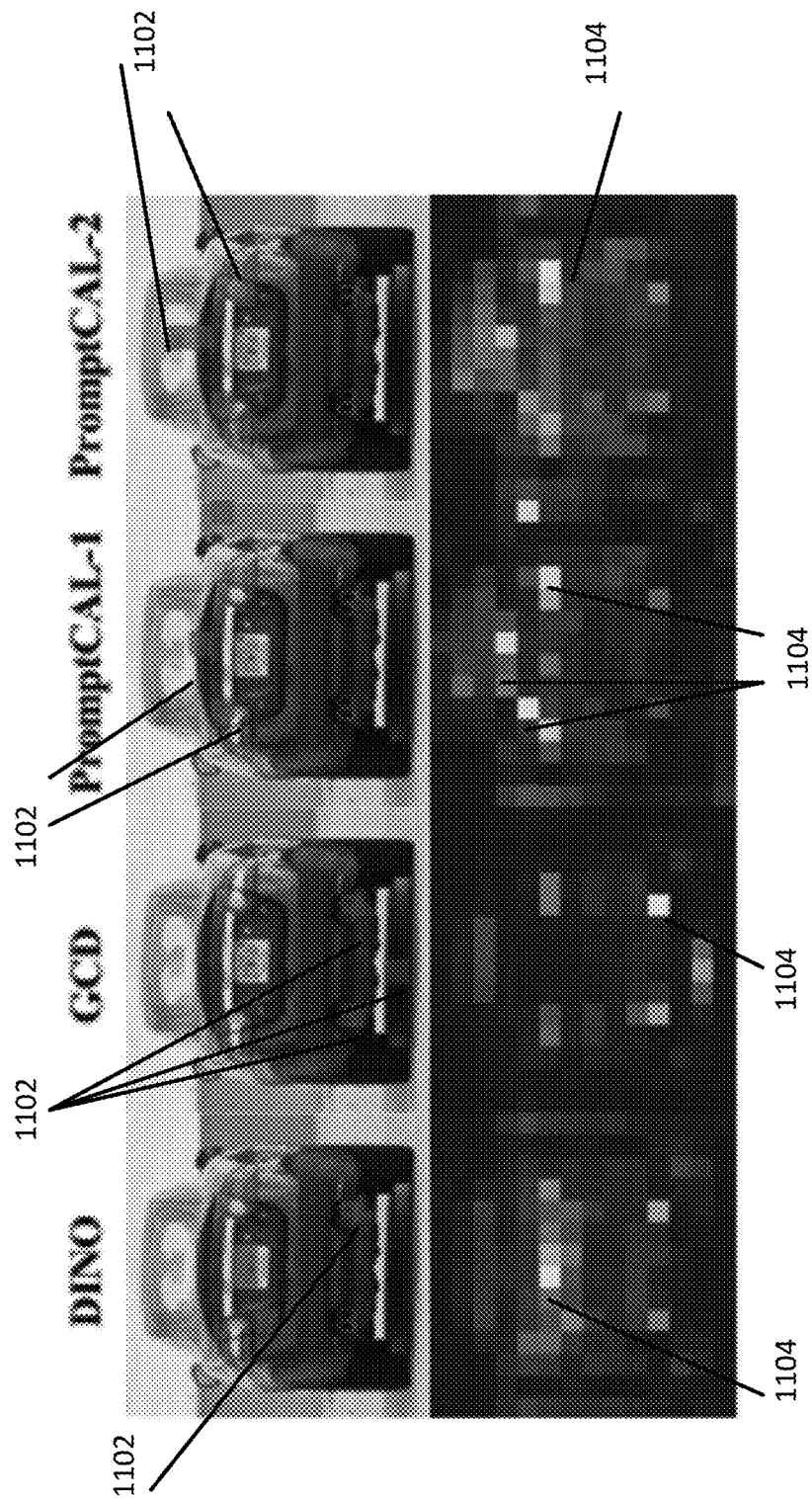
Figure 12C:
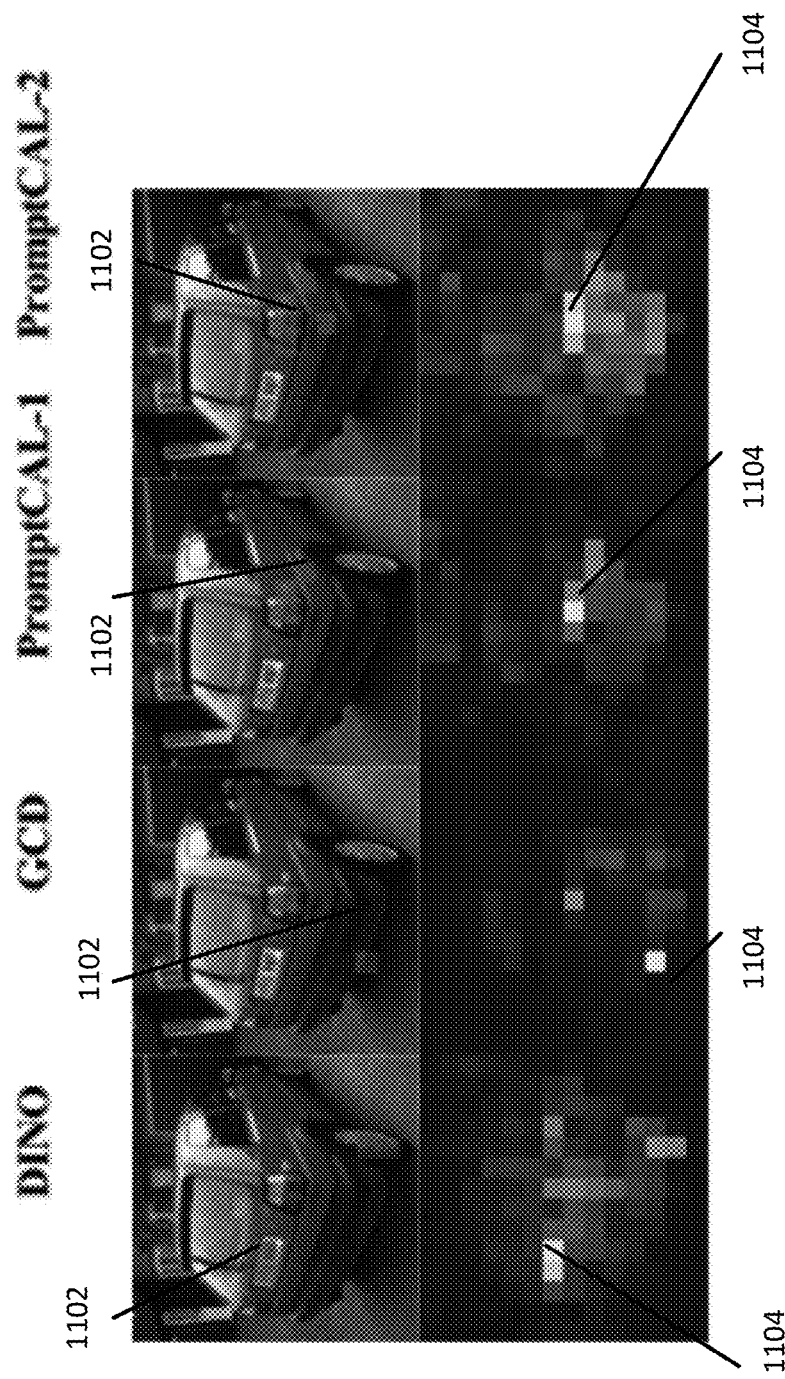
Figure 13A:
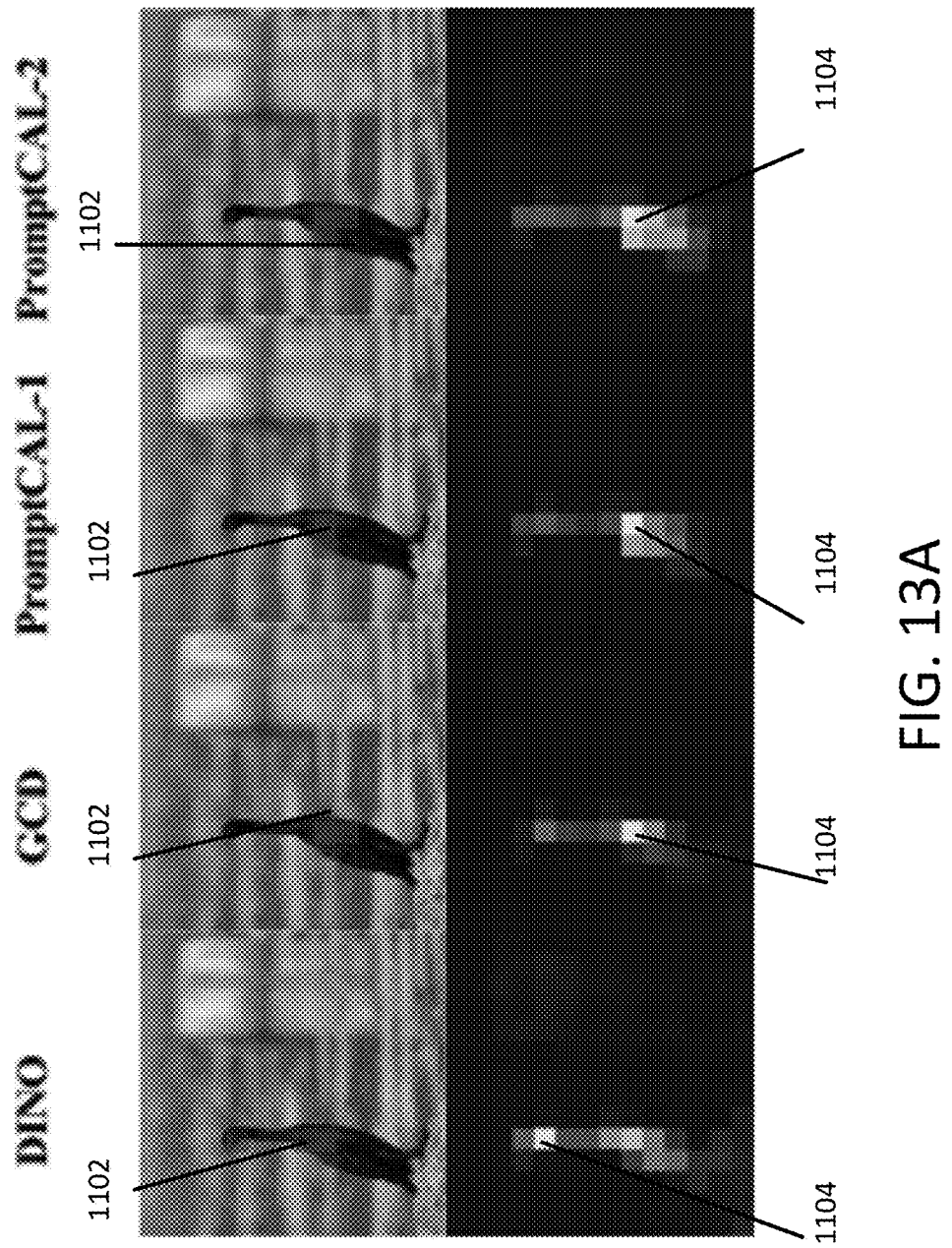
FIGS. 13A-13C illustrate attention map of class tokens for known images.
Figure 13B:
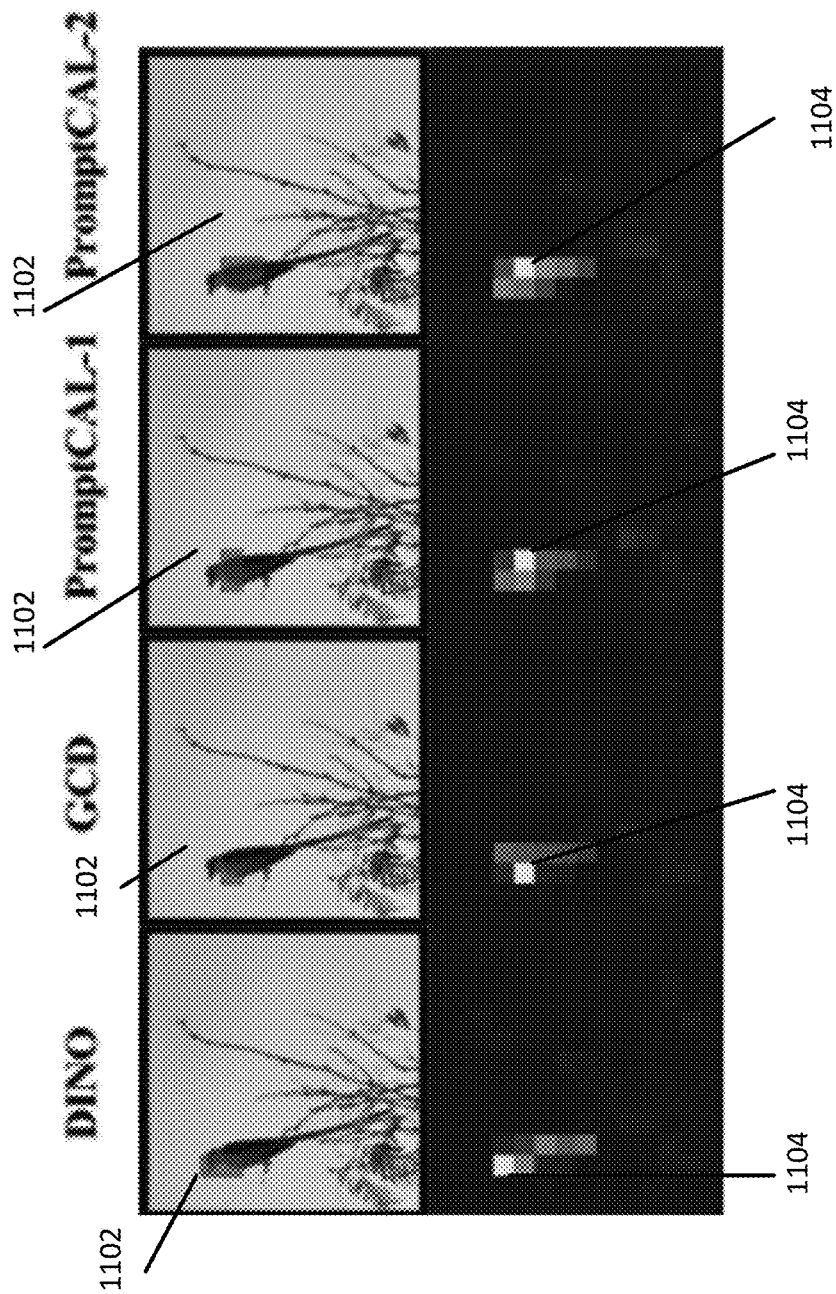
Figure 13C:
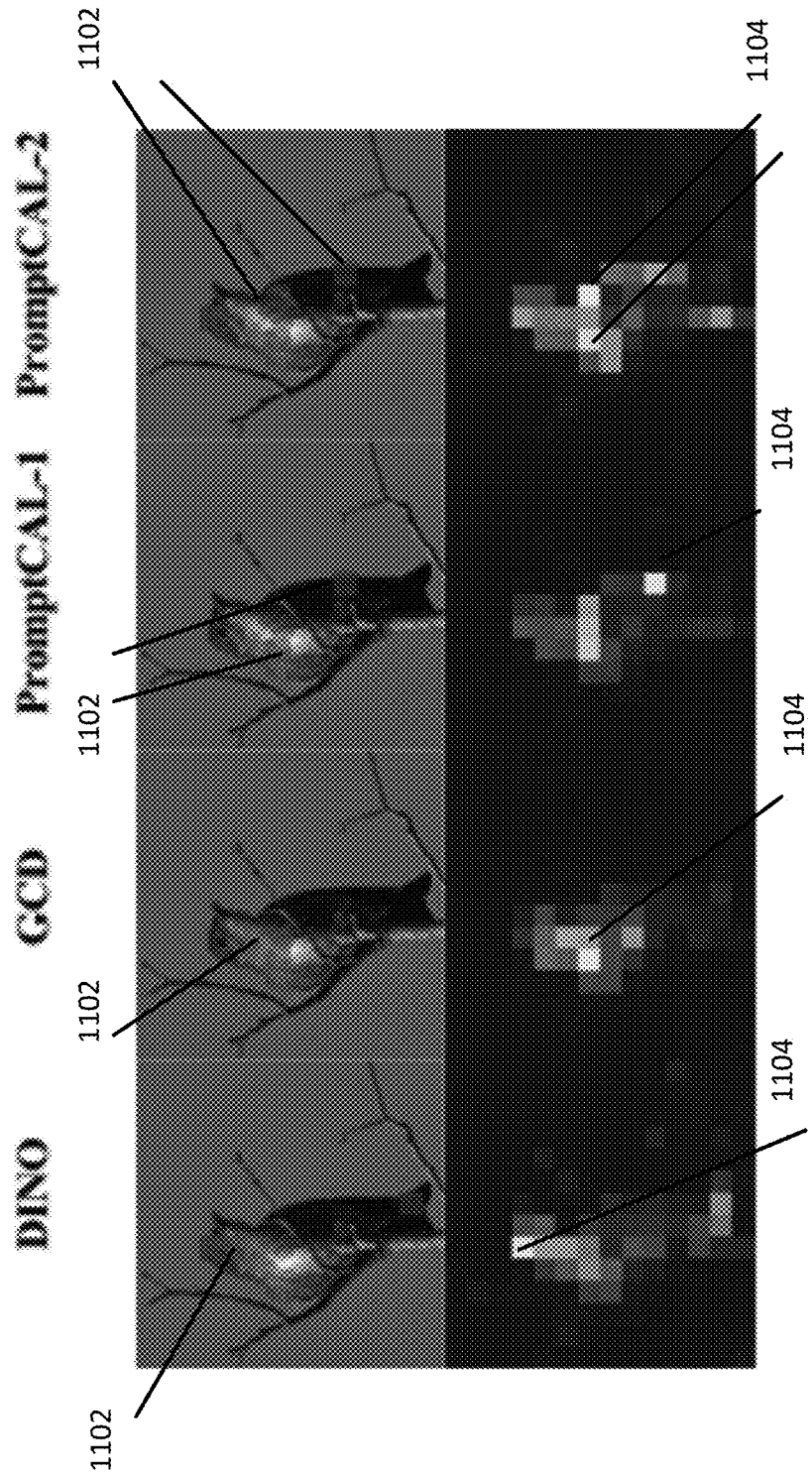
Figure 14A:
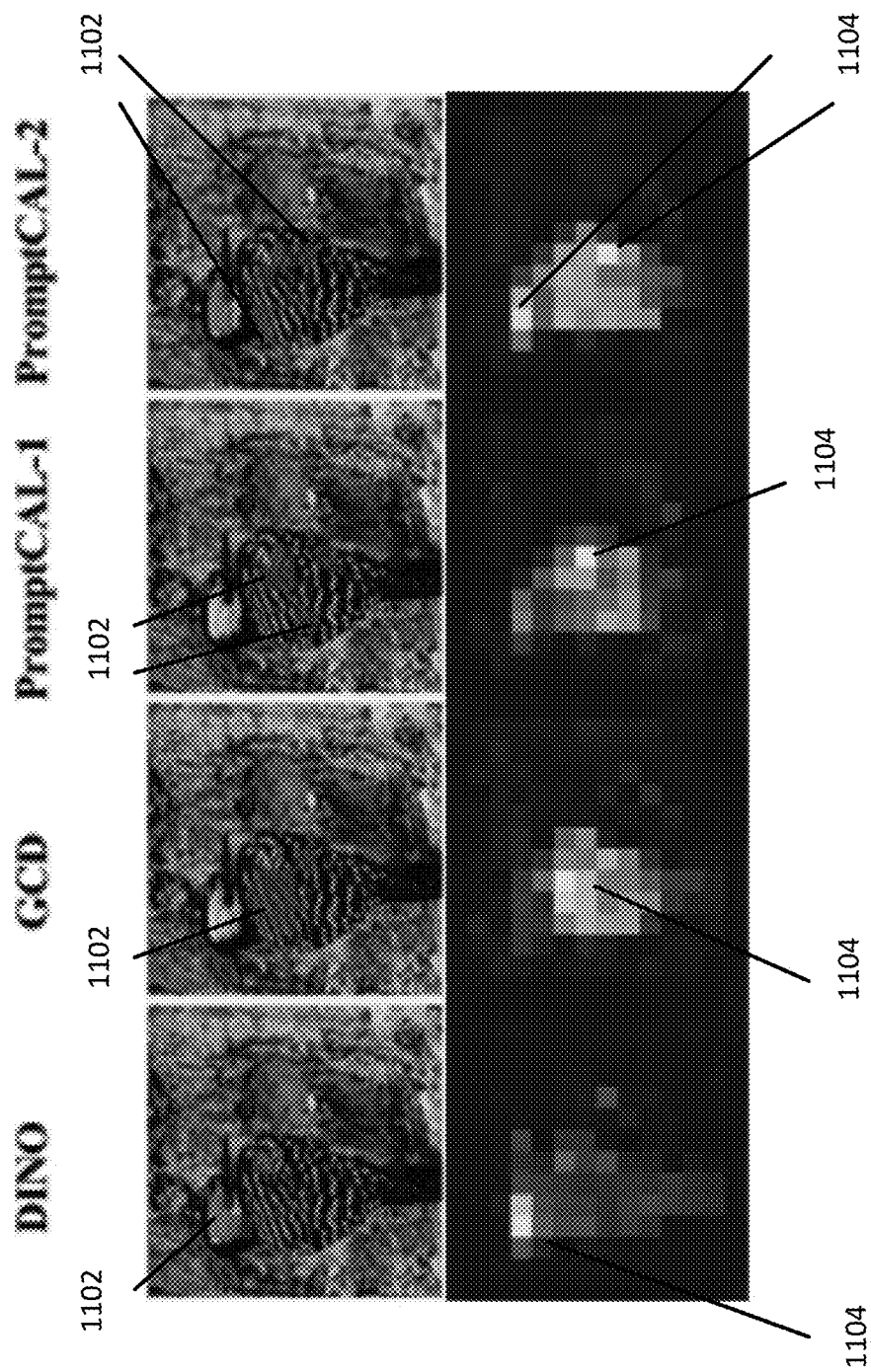
FIGS. 14A-14C illustrate attention map of class tokens for novel images.
Figure 14B:
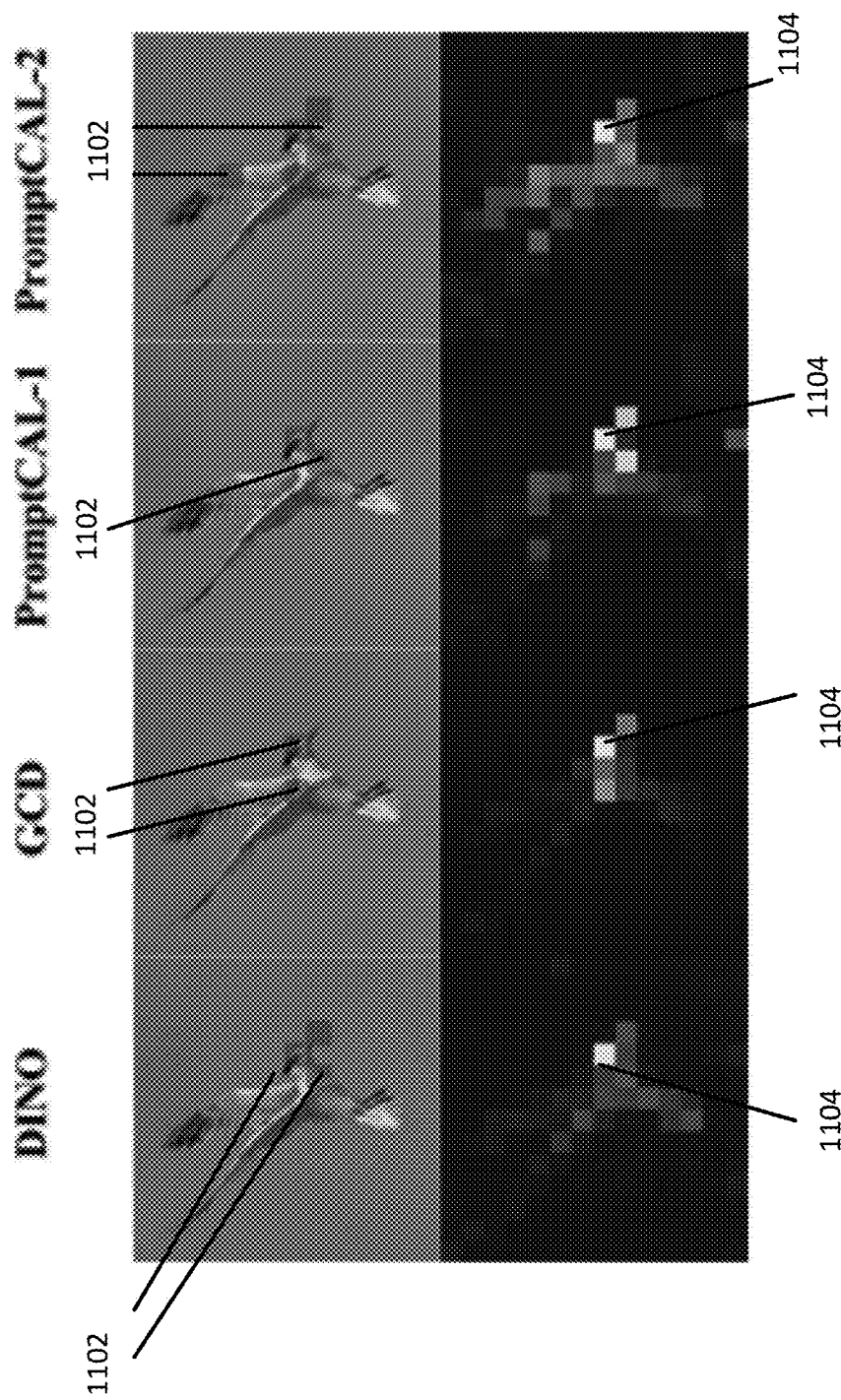
Figure 14C:
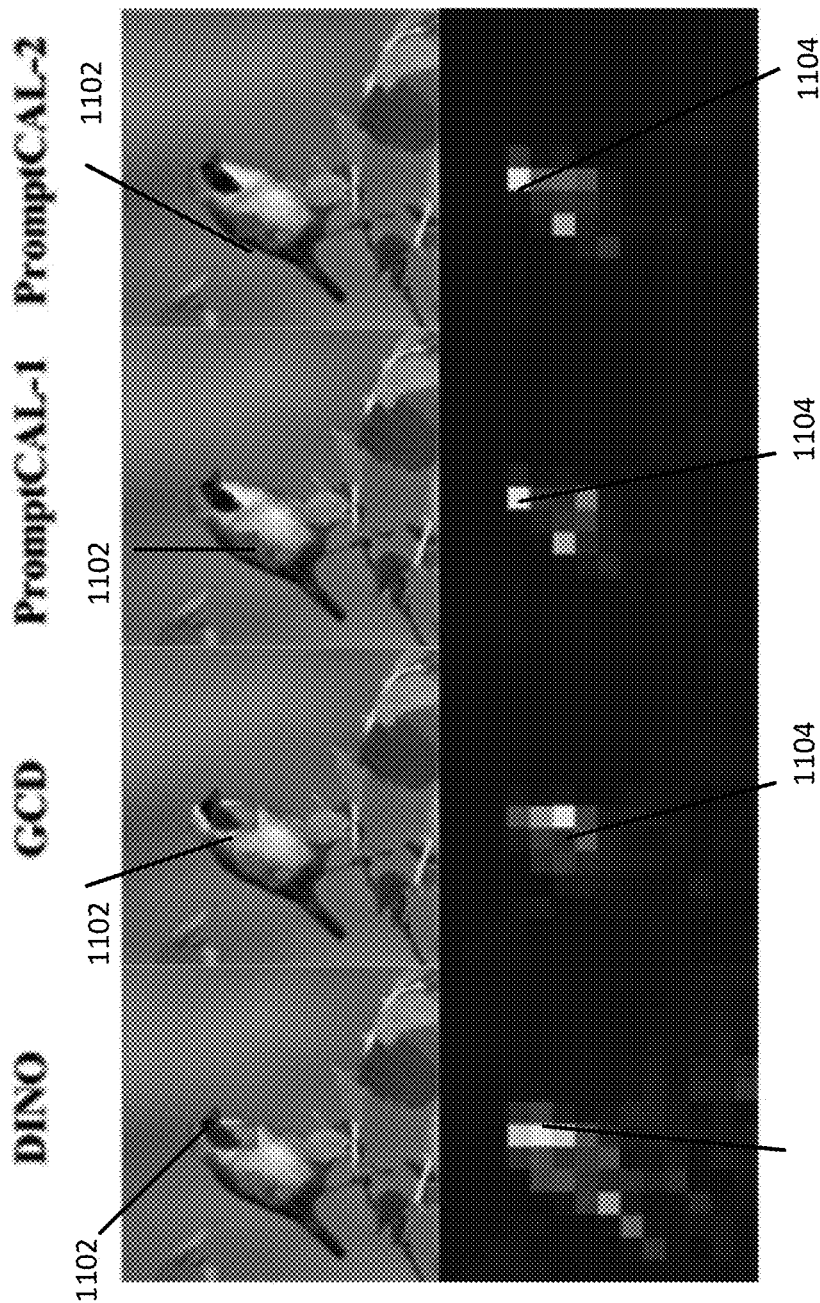

In FIG. 12, the 8 predicted nearest neighbors are visualized, from GCD and the Prompt-CAL, of 20 randomly selected query images, which are labeled with correct (green) and incorrect (red). Specifically, first randomly sample a subset from ImageNet-1K, and conduct KNN search (with cosine distance) for given random queries in [CLS] embedding space. FIG. 12 illustrates the visualization of retrieved 8-NN for 20 randomly selected query images (with blue borders). The correct/incorrect predictions are marked with green/red borders. The predictions on the left come from GCD, and the right is from PromptCAL. The first column contains ImageNet synsetIDs, category name, and Known/New for each query.

It can be observed that PromptCAL generally exhibits higher retrieval precision (e.g., for "n02006656" in $3^{rd}$ row, "02018207" in $5^{th}$ row, "n02027492" in $8^{th}$ row). To summarize, the Prompt-CAL learns more semantically calibrated local structures. It is also noticed that both GCD and PromptCAL fails on "n01695060" in $11^{th}$ row, which is due to the confusing view angle of the query image and high visual similarities between lizards of different species.

Efficiency Analysis

Compared with the raw ViT backbone (GCD), the PromptCAL only adds negligible computation overheads during inference, since the only overheads origin from visual prompts. Table 14 quantitatively lists inference time per image, thoughPut, and FLOPs for PromptCAL. It can be observed that the PromptCAL achieves comparable inference efficiency with the raw ViT backbone.

Next, further details of the hardware description of the computing environment of FIG. 4 according to exemplary embodiments is described with reference to FIG. 15.

FIG. 15 is a block diagram illustrating an example computer system for implementing the machine learning training and inference methods according to an exemplary aspect of the disclosure. The computer system may be an AI workstation running an operating system, for example Ubuntu Linux OS, Windows, a version of Unix OS, or Mac OS. The computer system 402 may include one or more central processing units (CPU) 1550 having multiple cores. The computer system 402 may include a graphics board 1512 having multiple GPUS, each GPU having GPU memory. The graphics board 1512 may perform many of the mathematical operations of the disclosed machine learning methods. The computer system 402 includes main memory 1502, typically random access memory RAM, which contains the software being executed by the processing cores 1550 and GPUs 1512, as well as a non-volatile storage device 1504 for storing data and the software programs. Several interfaces for interacting with the computer system 402 may be provided, including an I/O Bus Interface 1510, Input/Peripherals 1518 such as a keyboard, touch pad, mouse, Display Adapter 1516 and one or more Displays 1508, and a Network Controller 1506 to enable wired or wireless communication through a network 99. The interfaces, memory and processors may communicate over the system bus 1526. The computer system 402 includes a power supply 1521, which may be a redundant power supply.

In some embodiments, the computer system 402 may include a server CPU and a graphics card by NVIDIA, in which the GPUs have multiple CUDA cores. In some embodiments, the computer system 402 may include a machine learning engine 1512.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method of fine-grained image categorization, comprising:
capturing an image by a camera;
predicting, via a trained machine learning model, a label for at least one object in the captured image;
outputting the predicted label as a category of the captured image,
wherein the trained machine learning model is trained by contrastive affinity learning by processing circuitry configured to
retrieve, from an image database, a plurality of images having at least one object;
perform, in a warm-up stage, semi-supervised contrastive learning based on projected features of a class token and an ensembled prompt, respectively;
at each iteration, in a contrastive affinity learning stage,
forward a student model and an exponentially moving averaged (EMA) teacher model with different augmented views of the retrieved images;
enqueue teacher embeddings output from the teacher model into a corresponding token-specific memory; and
compute semi-supervised contrastive loss on a current batch and a contrastive affinity learning (CAL) loss for student embeddings output from the student model and the teacher embeddings with pseudo-labels from a affinity graph dynamically generated by semi-supervised affinity generation.

2. The method of claim 1, wherein the semi-supervised affinity generation includes:
generating, by the processing circuitry, affinity graphs for a class embedding and a prompt embedding respectively via affinity propagation with label constraints on corresponding consensus K nearest neighbor (KNN) graphs.

3. The method of claim 1, wherein both the warm-up stage and the contrastive affinity learning stage include calculating a discriminative prompt regularization (DPR) loss.

4. The method of claim 1, wherein the contrastive affinity learning stage includes dynamically constructing a sub-graph sub-sampled from the affinity graph supported by an extra embedding memory bank M and the EMA teacher model.

5. The method of claim 1, further including
gradually calibrating, based on the CAL loss, a semantic representation by learning from generated affinity constraints in the affinity graph.

6. The method of claim 1, wherein the retrieved plurality of images have a label ratio of fifty percent.

7. The method of claim 1, wherein the predicting adopts a class embedding as a final label prediction.

8. A mobile device system, comprising:
a camera for capturing an image;
mobile device processing circuitry configured to
predict, using a trained machine learning model, a label for at least one object in the captured image;
display the predicted label in conjunction with the image;
machine learning processing circuitry configured to train the machine learning model by contrastive affinity learning including
retrieving, from an image database, a plurality of images having at least one object;
performing, in a warm-up stage, semi-supervised contrastive learning based on projected features of a class token and an ensembled prompt, respectively;
at each iteration, in a contrastive affinity learning stage,
forwarding a student model and an exponentially moving averaged (EMA) teacher model with different augmented views of the retrieved images;
enqueuing teacher embeddings output from the teacher model into a corresponding token-specific memory; and
computing semi-supervised contrastive loss on a current batch and a contrastive affinity learning (CAL) loss for student embeddings output from the student model and the teacher embeddings with pseudo-labels from a affinity graph dynamically generated by semi-supervised affinity generation.

9. The mobile device system of claim 8, wherein the semi-supervised affinity generation includes generating, by the machine learning processing circuitry, affinity graphs for a class embedding and a prompt embedding respectively via affinity propagation with label constraints on corresponding consensus K nearest neighbor (KNN) graphs.

10. The mobile device system of claim 8, wherein in both the warm-up stage and the contrastive affinity learning stage, the machine learning processing circuitry is configured to calculate a discriminative prompt regularization (DPR) loss.

11. The mobile device system of claim 8, wherein in the contrastive affinity learning stage, the machine learning processing circuitry is configured to dynamically construct a sub-graph sub-sampled from the affinity graph supported by an extra embedding memory bank M and the EMA teacher model.

12. The mobile device system of claim 8, wherein the machine learning processing circuitry is further configured to gradually calibrate, based on the CAL loss, a semantic representation by learning from generated affinity constraints in the affinity graph.

13. The mobile device system of claim 8, wherein the retrieved plurality of images have a label ratio of fifty percent.

14. The mobile device system of claim 8, wherein the mobile device processing circuitry is further configured to adopt a class embedding as a final label prediction.

15. A system, comprising:

a plurality of camera equipped devices for capturing images of an object;

an image database for storing the captured images;

processing circuitry configured to train a machine learning model by contrastive affinity learning including retrieving, from the image database, a plurality of the captured images;

performing, in a warm-up stage, semi-supervised contrastive learning based on projected features of a class token and an ensembled prompt, respectively;

at each iteration, in a contrastive affinity learning stage, forwarding a student model and an exponentially moving averaged (EMA) teacher model with different augmented views of the retrieved images;

enqueuing teacher embeddings output from the teacher model into a corresponding token-specific memory; and computing semi-supervised contrastive loss on a current batch and a contrastive affinity learning (CAL) loss for student embeddings output from the student model and the teacher embeddings with pseudo-labels from a affinity graph dynamically generated by semi-supervised affinity generation; and processing circuitry configured to predict, using the trained machine learning model, a label for at least one object in the captured images;

output the predicted label in conjunction with the captured images.

16. The system of claim 15, wherein in the semi-supervised affinity generation, the processing circuitry is configured to generate affinity graphs for a class embedding and a prompt embedding respectively via affinity propagation with label constraints on corresponding consensus K nearest neighbor (KNN) graphs.

17. The system of claim 15, wherein in both the warm-up stage and the contrastive affinity learning stage, the processing circuitry is configured to calculate a discriminative prompt regularization (DPR) loss.

18. The system of claim 15, wherein in the contrastive affinity learning stage, the processing circuitry is configured to dynamically construct a sub-graph sub-sampled from the affinity graph supported by an extra embedding memory bank M and the EMA teacher model.

19. The system of claim 15, wherein the processing circuitry is further configured to gradually calibrate, based on the CAL loss, a semantic representation by learning from generated affinity constraints in the affinity graph.

20. The system of claim 15, wherein the retrieved plurality of captured images have a label ratio of fifty percent.

* * * * *